United States Patent
Langeveld

(10) Patent No.: US 11,397,269 B2
(45) Date of Patent: Jul. 26, 2022

(54) SYSTEMS AND METHODS FOR COMPTON SCATTER AND/OR PULSE PILEUP DETECTION

(71) Applicant: Rapiscan Systems, Inc., Torrance, CA (US)

(72) Inventor: Willem Gerhardus Johannes Langeveld, Menlo Park, CA (US)

(73) Assignee: Rapiscan Systems, Inc., Torrance, CA (US)

(*) Notice: Subject to any disclaimer, the term of this patent is extended or adjusted under 35 U.S.C. 154(b) by 0 days.

(21) Appl. No.: 17/156,229

(22) Filed: Jan. 22, 2021

(65) Prior Publication Data
US 2021/0231819 A1 Jul. 29, 2021

Related U.S. Application Data

(60) Provisional application No. 62/964,972, filed on Jan. 23, 2020.

(51) Int. Cl.
*G01T 1/36* (2006.01)
*G01T 1/208* (2006.01)

(52) U.S. Cl.
CPC .............. *G01T 1/361* (2013.01); *G01T 1/208* (2013.01)

(58) Field of Classification Search
CPC ................................ G01T 1/361; G01T 1/208
See application file for complete search history.

(56) References Cited

U.S. PATENT DOCUMENTS

| | | | |
|---|---|---|---|
| 4,893,017 A * | 1/1990 | Kronenberg | G01T 1/026 250/370.05 |
| 5,638,420 A | 6/1997 | Armistead | |
| 6,346,706 B1 * | 2/2002 | Rogers | G01T 1/2985 250/363.01 |
| 6,369,389 B1 | 4/2002 | Berlad | |
| 6,470,285 B1 * | 10/2002 | Atwell | G01T 1/171 702/189 |
| 6,473,487 B1 | 10/2002 | Le | |

(Continued)

OTHER PUBLICATIONS

International Search Report for PCT/US21/14719, dated Apr. 15, 2021.

*Primary Examiner* — Blake C Riddick
(74) *Attorney, Agent, or Firm* — Novel IP

(57) ABSTRACT

Systems and methods for detecting Compton scatter are provided. The system includes a first detector configured to detect incident radiation and output a first detector signal; more than one second detectors surrounding the first detector and configured to detect incident radiation scattered by the first detector, wherein each of the second detectors output a second detector signal, and wherein a signal decay time of the first detector signal differs from the signal decay time of the second detector signals; and a digitizer configured to receive a single input consisting of output signals from each of the first detector and the plurality of second detectors, wherein the digitizer is further configured to simultaneously digitize the signals to produce a digitized output waveform, and wherein a shape of the output waveform is indicative of a presence or an absence of a Compton scatter signal. The systems and methods are also configured to detect pulse pileup, with or without second detectors.

21 Claims, 22 Drawing Sheets

(56) References Cited

U.S. PATENT DOCUMENTS

| | | |
|---|---|---|
| 6,522,984 B1 * | 2/2003 | Jordanov .............. G01N 23/00 378/91 |
| 6,665,373 B1 | 12/2003 | Kotowski |
| 7,110,493 B1 | 9/2006 | Kotowski |
| 7,366,282 B2 | 4/2008 | Peschmann |
| 7,417,440 B2 | 8/2008 | Peschmann |
| 7,579,845 B2 | 8/2009 | Peschmann |
| 7,856,081 B2 | 12/2010 | Peschmann |
| 7,876,879 B2 | 1/2011 | Morton |
| 8,003,949 B2 | 8/2011 | Ryge |
| 8,135,110 B2 | 3/2012 | Morton |
| 8,138,770 B2 | 3/2012 | Peschmann |
| 8,148,693 B2 | 4/2012 | Ryge |
| 8,199,996 B2 | 6/2012 | Hughes |
| 8,223,919 B2 | 7/2012 | Morton |
| 8,243,876 B2 | 8/2012 | Morton |
| 8,389,942 B2 | 3/2013 | Morton |
| 8,401,147 B2 | 3/2013 | Ryge |
| 8,428,217 B2 | 4/2013 | Peschmann |
| 8,433,036 B2 | 4/2013 | Morton |
| 8,451,974 B2 | 5/2013 | Morton |
| 8,576,982 B2 | 11/2013 | Gray |
| 8,638,904 B2 | 1/2014 | Gray |
| 8,644,453 B2 | 2/2014 | Morton |
| 8,674,706 B2 | 3/2014 | Peschmann |
| 8,724,774 B2 | 5/2014 | Langeveld |
| 8,735,833 B2 | 5/2014 | Morto |
| 8,774,357 B2 | 7/2014 | Morton |
| 8,774,362 B2 | 7/2014 | Hughes |
| 8,885,794 B2 | 11/2014 | Morton |
| 8,903,046 B2 | 12/2014 | Morton |
| 8,908,831 B2 | 12/2014 | Bendahan |
| 8,921,796 B1 * | 12/2014 | Arseneau ................ G01T 1/171 250/362 |
| 8,958,526 B2 | 2/2015 | Morton |
| 8,993,970 B2 | 3/2015 | Morton |
| 8,995,619 B2 | 3/2015 | Gray |
| 9,020,095 B2 | 4/2015 | Morton |
| 9,042,511 B2 | 5/2015 | Peschmann |
| 9,113,839 B2 | 8/2015 | Morton |
| 9,121,958 B2 | 9/2015 | Morton |
| 9,158,030 B2 | 10/2015 | Morton |
| 9,182,516 B2 | 11/2015 | Gray |
| 9,268,058 B2 | 2/2016 | Peschmann |
| 9,274,065 B2 | 3/2016 | Morton |
| 9,285,325 B2 | 3/2016 | Gray |
| 9,291,741 B2 | 3/2016 | Gray |
| 9,404,875 B2 | 8/2016 | Langeveld |
| 9,429,530 B2 | 8/2016 | Morton |
| 9,442,082 B2 | 9/2016 | Morton |
| 9,562,866 B2 | 2/2017 | Morton |
| 9,584,742 B2 * | 2/2017 | Park ...................... H04N 5/347 |
| 9,606,259 B2 | 3/2017 | Morton |
| 9,618,648 B2 | 4/2017 | Morton |
| 9,632,205 B2 | 4/2017 | Morton |
| 9,774,806 B2 * | 9/2017 | Choi ...................... H04N 5/374 |
| 9,915,752 B2 | 3/2018 | Peschmann |
| 10,007,021 B2 | 6/2018 | Morton |
| 10,134,254 B2 | 11/2018 | Jarvi |
| 10,168,445 B2 | 1/2019 | Morton |
| 10,175,381 B2 | 1/2019 | Morton |
| 10,295,483 B2 | 5/2019 | Morton |
| 10,386,504 B2 | 8/2019 | Bendahan |
| 10,393,915 B2 | 8/2019 | Gozani |
| 10,408,967 B2 | 9/2019 | Morton |
| 10,591,424 B2 | 3/2020 | Morton |
| 10,663,616 B2 | 5/2020 | Morton |
| 10,698,128 B2 | 6/2020 | Morton |
| 10,713,914 B2 | 7/2020 | Jarvi |
| 10,816,691 B2 | 10/2020 | Morton |
| 10,901,112 B2 | 1/2021 | Morton |
| 10,901,113 B2 | 1/2021 | Morton |
| 10,942,291 B2 | 3/2021 | Morton |
| 10,976,271 B2 | 4/2021 | Morton |
| 11,012,649 B2 * | 5/2021 | Guidash ................ H04N 5/378 |
| 11,119,245 B2 | 9/2021 | Morton |
| 2004/0188623 A1 * | 9/2004 | Breeding .............. G01T 1/2985 250/363.03 |
| 2005/0058242 A1 | 3/2005 | Peschmann |
| 2005/0104603 A1 | 5/2005 | Peschmann |
| 2006/0098773 A1 | 5/2006 | Peschmann |
| 2008/0304622 A1 | 12/2008 | Morton |
| 2009/0010386 A1 | 1/2009 | Peschmann |
| 2009/0041187 A1 | 2/2009 | Peschmann |
| 2009/0060135 A1 | 3/2009 | Morton |
| 2009/0141860 A1 | 6/2009 | Ryge |
| 2010/0034451 A1 | 2/2010 | Hughes |
| 2010/0085066 A1 | 4/2010 | Peschmann |
| 2010/0246754 A1 | 9/2010 | Morton |
| 2010/0303287 A1 | 12/2010 | Morton |
| 2011/0019797 A1 | 1/2011 | Morton |
| 2011/0096906 A1 | 4/2011 | Langeveld |
| 2011/0116599 A1 | 5/2011 | Morton |
| 2011/0116600 A1 | 5/2011 | Morton |
| 2011/0182407 A1 | 7/2011 | Morton |
| 2011/0196234 A1 * | 8/2011 | Buono ................... G01T 1/161 600/436 |
| 2011/0228896 A1 | 9/2011 | Peschmann |
| 2011/0243382 A1 | 10/2011 | Morton |
| 2011/0253898 A1 | 10/2011 | Ryge |
| 2011/0274249 A1 | 11/2011 | Gray |
| 2011/0274250 A1 | 11/2011 | Gray |
| 2011/0299659 A1 | 12/2011 | Gray |
| 2012/0043467 A1 * | 2/2012 | Gueorguiev ......... G01T 1/2907 250/363.01 |
| 2012/0155592 A1 | 6/2012 | Gozani |
| 2012/0213331 A1 | 8/2012 | Peschmann |
| 2012/0217408 A1 | 8/2012 | Ryge |
| 2012/0230463 A1 | 9/2012 | Morton |
| 2012/0288063 A1 | 11/2012 | Hughes |
| 2013/0028372 A1 | 1/2013 | Morton |
| 2013/0039472 A1 | 2/2013 | Morton |
| 2013/0230139 A1 | 9/2013 | Morton |
| 2013/0251098 A1 | 9/2013 | Morton |
| 2013/0294574 A1 | 11/2013 | Peschmann |
| 2013/0299703 A1 | 11/2013 | Morton |
| 2013/0336446 A1 | 12/2013 | Morton |
| 2013/0336447 A1 | 12/2013 | Morton |
| 2014/0133630 A1 | 5/2014 | Gray |
| 2014/0177793 A1 | 6/2014 | Morton |
| 2014/0185771 A1 | 7/2014 | Morton |
| 2014/0226789 A1 | 8/2014 | Bendahan |
| 2014/0321588 A1 | 10/2014 | Gozani |
| 2014/0333326 A1 | 11/2014 | Peschmann |
| 2014/0341340 A1 | 11/2014 | Langeveld |
| 2014/0341345 A1 | 11/2014 | Morton |
| 2014/0348293 A1 | 11/2014 | Morton |
| 2015/0102227 A1 * | 4/2015 | Nygrd ................... G01T 1/247 250/370.09 |
| 2015/0110240 A1 | 4/2015 | Morton |
| 2015/0110250 A1 | 4/2015 | Gray |
| 2015/0168589 A1 | 6/2015 | Morton |
| 2015/0330917 A1 | 11/2015 | Morton |
| 2015/0355117 A1 | 12/2015 | Morton |
| 2015/0355369 A1 | 12/2015 | Morton |
| 2016/0018342 A1 | 1/2016 | Morton |
| 2016/0025888 A1 | 1/2016 | Peschmann |
| 2016/0041298 A1 | 2/2016 | Gray |
| 2016/0154139 A1 | 6/2016 | Morton |
| 2016/0170077 A1 | 6/2016 | Morton |
| 2016/0223706 A1 | 8/2016 | Franco |
| 2016/0231454 A1 | 8/2016 | Morton |
| 2016/0232769 A1 | 8/2016 | Jarvi |
| 2016/0341847 A1 | 11/2016 | Arroyo, Jr. |
| 2017/0023696 A1 | 1/2017 | Morton |
| 2017/0023698 A1 | 1/2017 | Morton |
| 2017/0123077 A1 | 5/2017 | Bendahan |
| 2017/0299526 A1 | 10/2017 | Morton |
| 2017/0299763 A1 | 10/2017 | Morton |
| 2017/0299764 A1 | 10/2017 | Morton |
| 2018/0038988 A1 | 2/2018 | Morton |
| 2018/0180747 A1 * | 6/2018 | Matsuura ................. G01T 1/24 |
| 2018/0284316 A1 | 10/2018 | Morton |
| 2018/0299580 A1 | 10/2018 | Morton |

(56) References Cited

U.S. PATENT DOCUMENTS

| | | | |
|---|---|---|---|
| 2018/0356540 A1* | 12/2018 | Gemba | ............... G01T 1/361 |
| 2019/0137652 A1 | 5/2019 | Morton | |
| 2019/0139385 A1 | 5/2019 | Jarvi | |
| 2019/0353821 A1 | 11/2019 | Morton | |
| 2019/0361144 A1 | 11/2019 | Morton | |
| 2020/0025955 A1 | 1/2020 | Gozani | |
| 2020/0103357 A1 | 4/2020 | Morton | |
| 2020/0158908 A1 | 5/2020 | Morton | |
| 2020/0200690 A1 | 6/2020 | Morton | |
| 2020/0378906 A1 | 12/2020 | Morton | |
| 2020/0378907 A1 | 12/2020 | Morton | |
| 2020/0386904 A1 | 12/2020 | Morton | |
| 2021/0011190 A1 | 1/2021 | Morton | |
| 2021/0165122 A1 | 6/2021 | Morton | |
| 2021/0215846 A1 | 7/2021 | Morton | |
| 2021/0231819 A1 | 7/2021 | Langeveld | |
| 2021/0349233 A1 | 11/2021 | Morton | |
| 2021/0373191 A1 | 12/2021 | Morton | |
| 2021/0373192 A1 | 12/2021 | Morton | |
| 2022/0011462 A1 | 1/2022 | Morton | |

\* cited by examiner

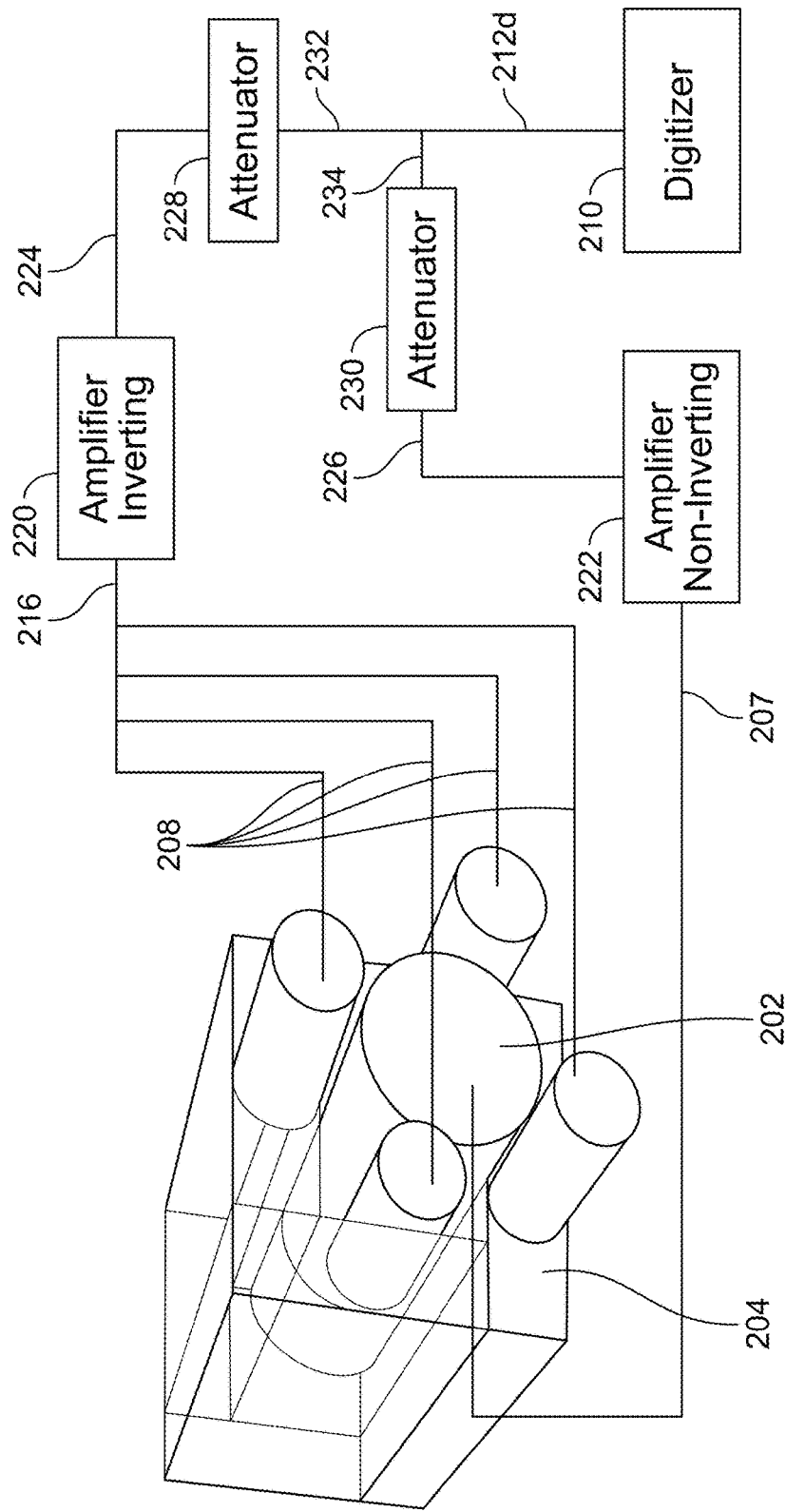
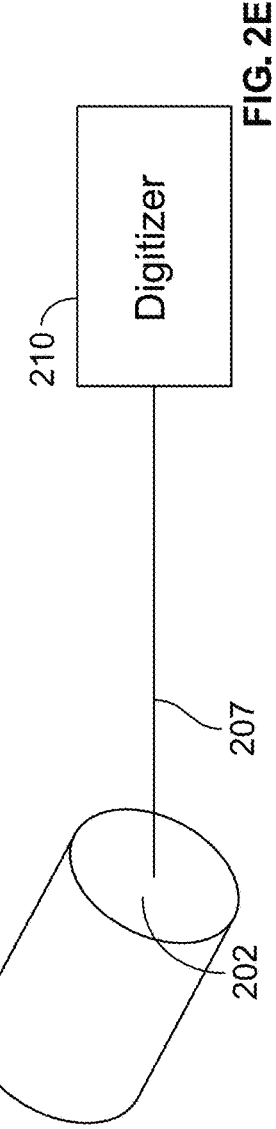
FIG. 2D
FIG. 2E

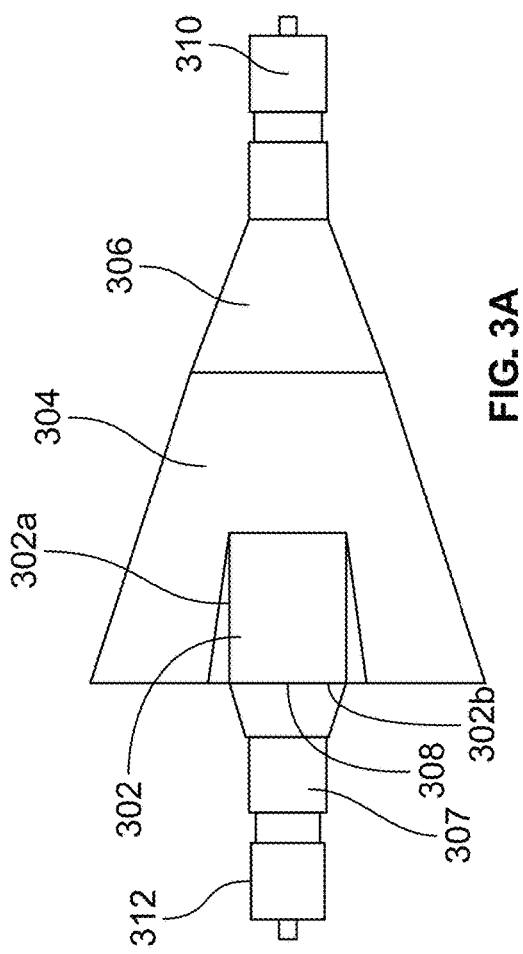
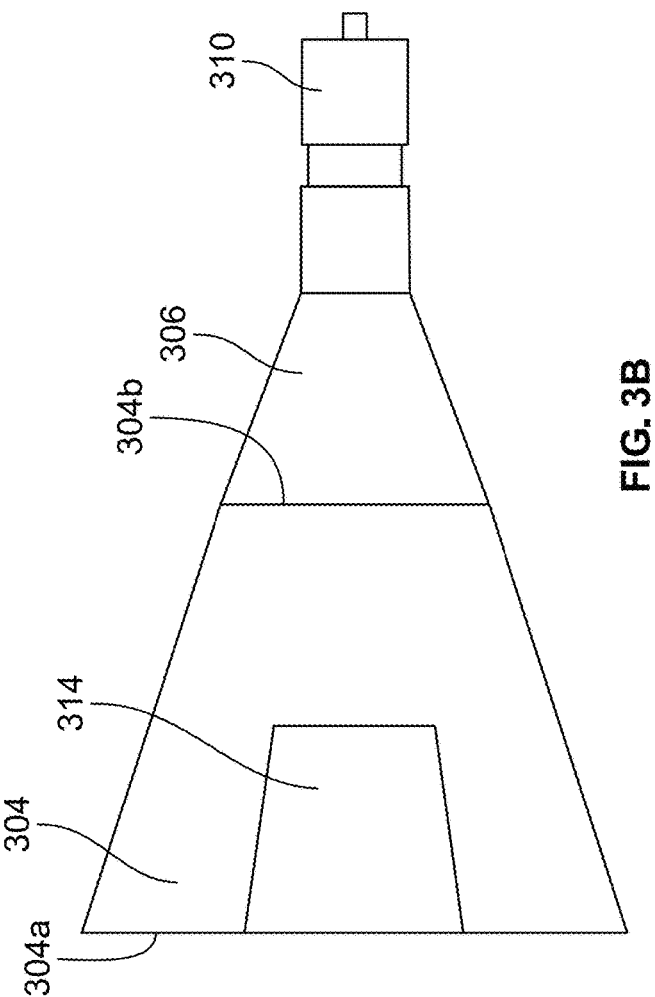
FIG. 3A
FIG. 3B

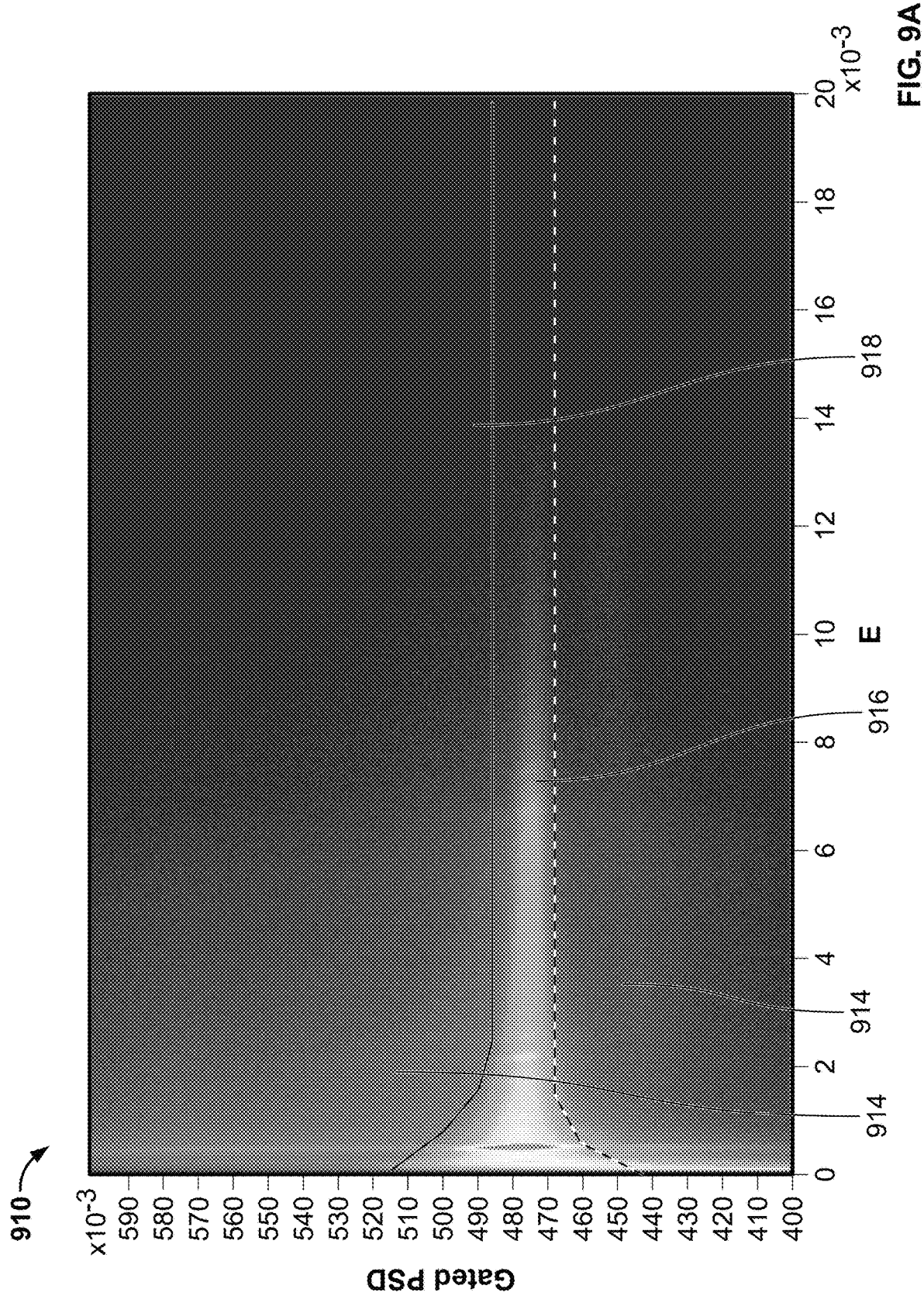

SYSTEMS AND METHODS FOR COMPTON SCATTER AND/OR PULSE PILEUP DETECTION

CROSS-REFERENCE

The present application relies on, for priority, U.S. Patent Provisional Application No. 62/964,972, titled "Systems and Methods for Compton Scatter Detection", and filed on Jan. 23, 2020, which is herein incorporated by reference in its entirety.

FIELD

The present specification generally relates to detector systems. More specifically the present specification relates to systems and methods for reducing Compton background and/or for suppressing signals due to pulse pileup by using novel detector and pulse shape discrimination processing systems.

BACKGROUND

Compton scattering is the scattering of a photon by a charged particle, usually an electron. It results in a decrease in energy (increase in wavelength) of the photon (which may be an X-ray or gamma-ray photon), known as the Compton effect. Various techniques are employed to reduce the effect of Compton scattering during radiation detection. One known technique comprises the use of Compton suppression shields, which are scintillation detector assemblies that are mounted around, for example, a Germanium (Ge) detector to detect the gamma rays scattered by the Ge crystal when a Compton event occurs. When Compton-scattered gamma rays escape from the Ge detector and are absorbed and detected in the Compton suppression shield, they are coincident in time with the gamma rays detected in the Ge detector. When coincident signals are observed in the Ge detector and the Compton suppression shield, a Compton event is indicated and the signals may be rejected.

With the use of an anti-Compton shield, where a smaller primary gamma-radiation detector is surrounded by a larger set of secondary detectors, either an incident gamma ray deposits all of its energy in the primary gamma-radiation detector, or it deposits only a fraction of the energy in the gamma-radiation detector and scatters out of said detector, to be (wholly or partially) captured by the surrounding detectors. Hence, only if the surrounding detectors do not detect any signal coincident with the gamma-radiation detector, which does not reliably occur, the spectrum detected from the gamma-radiation detector will have enhanced photo peaks on top of a lower Compton background.

Various known methods of implementing the Compton shield in hardware require the use of separate channels of electronics for each detector being used, as well as an anti-coincidence circuit. In other known implementations of the Compton shield in software, timing analysis of separate waveforms detected by each detector is required in order to determine occurrence of coincidence.

In the presence of a high-intensity field of radiation, it is further possible that multiple gamma-ray events arrive at the detector at approximately the same time. This is known to those skilled in the art as pulse pileup, signal pileup, or simply pileup. Pulse pileup is detrimental to the analysis of radiation signals, since it leads to two or more signals being merged into a single signal, causing incorrect data interpretation and increased background in the resulting spectra.

Hence, there is need for a system and method for suppressing Compton background in detectors which does not require complex circuitry or specialized software analysis tools for Compton background suppression. In addition, there is a need for a system and method for suppressing signals occurring from pulse pileup.

SUMMARY

The following embodiments and aspects thereof are described and illustrated in conjunction with systems, tools and methods, which are meant to be exemplary and illustrative, not limiting in scope.

The present specification discloses a system for reducing Compton scatter contributions to spectra comprising: a first detector system configured to detect incident radiation and output a first analog detector signal; a second detector system surrounding the first detector system and configured to detect incident radiation scattered by the first detector system, wherein the second detector system outputs a second analog detector signal, and wherein a signal shape of the first analog detector signal differs from a signal shape of the second analog detector signal; and a digitizer configured to receive a single input consisting of combined analog output signals from each of the first detector system and the second detector system, wherein the digitizer is further configured to simultaneously digitize the analog signals to produce a digitized output signal defined by a digitized output signal waveform, and wherein a shape of the digitized output signal waveform is indicative of a presence or an absence of a Compton scatter signal.

Optionally, the signal shape of the first analog detector signal and the signal shape of the second analog detector signal are each dependent on a signal decay time, a signal delay, or signal inversion. Optionally, a signal decay time of the second detector system is longer than a signal decay time of the first detector system. Optionally, a signal decay time of the second detector system is shorter than a signal decay time of the first detector system. Optionally, a signal decay time of the second detector system is equal to a signal decay time of the first detector system, and wherein the analog signal output from the second detector system is delayed relative to the analog signal output of the first detector system.

The first detector system may comprise one or more detectors.

The second detector system may comprise one or more detectors.

Optionally, the system further comprises at least one processor, wherein the at least one processor is configured to analyze the digitized output signal waveform and wherein a presence of a distortion signal at a predefined time in the waveform is indicative of at least one scattered signal detected by the second detector system. Optionally, the at least one processor is configured to determine that the Compton scatter signal is present if the waveform has the distortion signal indicative of at least one scattered signal detected by the second detector system.

Optionally, the system further comprises at least one processor, wherein the at least one processor is configured to analyze the digitized output signal waveform and wherein a presence of a distortion signal in the waveform is indicative of a pulse pileup detected by the first detector system.

Optionally, the first detector system comprises a first scintillation material and the second detector system comprise a second scintillation material different from the first scintillation material. Optionally, the first scintillation material is one of: plastic scintillators, liquid scintillators, Cerium Bromide ($CeBr_3$), Lanthanum Bromide ($LaBr_3$), Lutetium Silicate (LSO), Lutetium Yttrium Ortho-Silicate (LYSO), and Lead Tungstate ($PbWO_4$). Optionally, the second scintillation material is one of: Sodium Iodide (NaI), Cesium Iodide (CsI), Strontium Iodide (SrI), Cadmium Tungstate ($CdWO_4$), Bismuth Germanate (BGO), and liquid scintillator. Optionally, the first scintillation material has a first signal decay time and the second scintillation material has a second signal decay time which is shorter than the first decay time. Optionally, the first scintillation material has a first signal decay time and the second scintillation material has a second signal decay time which is equal to the first signal decay time. Optionally, the first scintillation material has a first signal decay time and the second scintillation material has a second signal decay time longer than the first signal decay time. Optionally, the first decay time is smaller than 50 ns and the second decay time is longer than 100 ns. Optionally, the signal decay time of the second detector system signal is delayed with respect to the signal decay time of the first detector system signal by passing the second detector system signal through a coaxial cable having a predefined length, before the second detector system signals are input to the digitizer. Optionally, the predefined length of the coaxial cable provides a delay in the signal decay time of the second detector system signal, wherein the delay is between 0.1 and 10 times the signal decay time of the first detector system signal.

Optionally, the signal from the second detector system is inverted by use of an electronic circuit, before being combined with the signal of the first detector system.

Optionally, the signal from the first detector system is inverted by use of an electronic circuit, before being combined with the signal of the second detector system.

Optionally, the digitized output signal waveform is analyzed by using one or more pulse shape discrimination (PSD) techniques. Optionally, the PSD technique used comprises one of a gated PSD technique, a pulse shape fitting technique, and a technique based on a wavelet algorithm.

The present specification also discloses a method for reducing Compton scatter contributions or pileup signal contributions to detected signals comprising: detecting incident radiation using a first detector system outputting a first analog detector signal; detecting incident radiation scattered by the first detector system using a second detector system positioned around the first detector system, wherein the second detector system outputs a second analog detector signal, and wherein a signal shape of the second analog detector signal differs from a signal shape of the first analog detector signal; combining the first analog detector signal and the second analog detector signal, using a summing circuit or signal combination wiring, before digitizing either the first analog detector signal or the second analog detector signal to form a combined analog signal; digitizing, using at least one digitizer, the combined analog signal to create a digitized output signal defined by a digitized output signal waveform; using at least one processor, analyzing the digitized output signal waveform to determine a presence or an absence of a Compton scatter signal or a presence or an absence of a pileup signal, wherein a shape of the digitized output signal waveform is indicative of the presence or the absence of the Compton scatter signal or is indicative of the presence or the absence of the pileup signal; and accepting the digitized output signal if the Compton scatter signal and the pileup signal are absent or rejecting the digitized output signal if the Compton signal or the pileup signal is present.

Optionally, the second detector system is circumferentially positioned around the first detector system.

Optionally, the signal shape of the first analog detector signal and the signal shape of the second analog detector signal are each dependent on a signal decay time, a signal delay, or signal inversion. Optionally, a signal decay time of the detectors of the second detector system is longer than a signal decay time of the detectors of the first detector system. Optionally, a signal decay time of the detectors of the second detector system is shorter than a signal decay time of the detectors of the first detector system. Optionally, a signal decay time of the detectors of the second detector system is same as a signal decay time of the detectors of the first detector system, and wherein a signal output from the second detector system is delayed relative to a signal output of the first detector system.

The first detector system may comprise one or more detectors.

The second detector system may comprise one or more detectors.

Optionally, analyzing the digitized output signal waveform comprises detecting a presence of a predefined waveform at a predefined time in the digitized output signal waveform, wherein the detected presence is indicative of at least one scattered signal detected by the second detector system. Optionally, the presence of at least one scattered signal detected by the second detector system is indicative of a Compton scatter signal.

Optionally, the first detector system comprises a first scintillation material and the second detector system comprise a second scintillation material different from the first scintillation material. Optionally, the first scintillation material is at least one of plastic scintillators, liquid scintillators, Cerium Bromide ($CeBr_3$), Lanthanum Bromide ($LaBr_3$), Lutetium Silicate (LSO), Lutetium Yttrium Ortho-Silicate (LYSO), or Lead Tungstate ($PbWO_4$). Optionally, the second scintillation material is at least one of Sodium Iodide (NaI), Cesium Iodide (CsI), Strontium Iodide (SrI), Cadmium Tungstate ($CdWO_4$), Bismuth Germanate (BGO), or a liquid scintillator. Optionally, the first scintillation material has a first signal decay time and the second scintillation material has a second signal decay time longer than the first decay time. Optionally, the first signal decay time is smaller than 50 ns and the second signal decay time is longer than 100 ns. Optionally, the first scintillation material has a first signal decay time, and the second scintillation material has a second signal decay time shorter than the first decay time. Optionally, the first scintillation material has a first decay time, and the second scintillation material has a second decay time equal to the first decay time.

Optionally, the second analog detector signal is delayed with respect to the first analog detector signal by passing the second analog detector signal through a coaxial cable having a predefined length, before the second analog detector signal is input to the digitizer. Optionally, the predefined length of the coaxial cable provides a delay in the second analog detector signal, wherein the delay is at least equal to a signal decay time of the first analog detector signal.

Optionally, analyzing the digitized output signal waveform comprises detecting a presence of a predefined waveform at a predefined time in the digitized output signal, wherein the detected presence is indicative of at least one distortion signal. Optionally, the presence of the at least one distortion signal is indicative of the pileup signal contribution.

The present specification also discloses a detection system configured to reduce Compton scatter contributions or pileup signal contributions to detected signals comprising: a first detector system configured to detect incident radiation and output a first analog detector signal; a second detector system configured to detect incident radiation scattered by the first detector system, wherein the second detector system is positioned around the first detector system, wherein the second detector system is configured to output a second analog detector signal, and wherein a signal shape of the second analog detector signal differs from a signal shape of the first analog detector signal; at least one summing circuit configured to combine the first analog detector signal and the second analog detector signal before digitizing either the first analog detector signal or the second analog detector signal to form a combined analog signal; at least one digitizer to digitize the combined analog signal to create a digitized output signal defined by a digitized output signal waveform; and, at least one processor configured to analyze the digitized output signal waveform to determine a presence or an absence of a Compton scatter signal or a presence of an absence of a pileup signal, wherein a shape of the digitized output signal waveform is indicative of the presence or the absence of the Compton scatter signal or is indicative of the presence or the absence of the pileup signal and wherein the digitized output signal is accepted if the Compton scatter signal and the pileup signal are absent or the digitized output signal is rejected if the Compton signal or the pulse pileup signal is present.

Optionally, the signal shape of the first analog detector signal and the signal shape of the second analog detector signal are each dependent on a signal decay time, a signal delay, or signal inversion. Optionally, a signal decay time of the detectors of the second detector system is longer than a signal decay time of the detectors of the first detector system. Optionally, a signal decay time of the detectors of the second detector system is shorter than a signal decay time of the detectors of the first detector system. Optionally, a signal decay time of the detectors of the second detector system is the same as a signal decay time of the detectors of the first detector system, and wherein a signal output from the second detector system is delayed relative to a signal output of the first detector system.

Optionally, the first detector system comprises one or more detectors and the second detector system comprises one or more detectors.

Optionally, the at least one processor is configured to analyze the digitized output signal waveform by detecting a presence of a predefined waveform at a predefined time in the digitized output signal wherein the detected presence is indicative of at least one scattered signal detected by the second detector system. Optionally, the presence of at least one scattered signal detected by the second detector system is indicative of a Compton scatter signal.

Optionally, the first detector system comprises a first scintillation material and the second detector system comprise a second scintillation material different from the first scintillation material. Optionally, the first scintillation material is at least one of plastic scintillators, liquid scintillators, Cerium Bromide (CeBr$_3$), Lanthanum Bromide (LaBr$_3$), Lutetium Silicate (LSO), Lutetium Yttrium Ortho-Silicate (LYSO), or Lead Tungstate (PbWO$_4$) and the second scintillation material is at least one of Sodium Iodide (NaI), Cesium Iodide (CsI), Strontium Iodide (SrI), Cadmium Tungstate (CdWO$_4$), Bismuth Germanate (BGO), or a liquid scintillator. Optionally, the first scintillation material has a first decay time and the second scintillation material has a second decay time longer than the first decay time. Optionally, the first decay time is smaller than 50 ns and the second decay time is longer than 100 ns. Optionally, the first scintillation material has a first decay time, and the second scintillation material has a second decay time shorter than the first decay time. Optionally, the first scintillation material has a first decay time, and the second scintillation material has a second decay time equal to the first decay time.

Optionally, the second analog detector signal is delayed with respect to the first analog detector signal by passing the second analog detector signal through a coaxial cable having a predefined length, before the second analog detector signal is input to the digitizer. Optionally, the predefined length of the coaxial cable provides a delay in the second analog detector signal, wherein the delay is at least equal to a signal decay time of the first analog detector signal.

Optionally, the at least one processor is configured to analyze the digitized output signal waveform by detecting a presence of a predefined waveform at a predefined time in the digitized output signal, wherein the detected presence is indicative of at least one distortion signal detected by the first detector system. Optionally, the presence of the at least one distortion signal is indicative of the pulse pileup having occurred.

The present specification also discloses a method for reducing pileup signal contributions to detected signals comprising: detecting incident radiation using a first detector system outputting a first analog detector signal; digitizing the analog signal to create a digitized output signal defined by a digitized output signal waveform; using at least one processor, analyzing the digitized output signal waveform to determine a presence or an absence of a pileup signal, wherein a shape of the digitized output signal waveform is indicative of the presence or the absence of the pileup signal; and accepting the digitized output signal if the pileup signal is absent or rejecting the digitized output signal if the pileup signal is present.

Optionally, the method further comprises detecting incident radiation scattered by the first detector system using a second detector system positioned around the first detector system, wherein the second detector system outputs a second analog detector signal, and wherein a signal shape of the second analog detector signal differs from a signal shape of the first analog detector signal. Optionally, the method further comprises combining the first analog detector signal and the second analog detector signal before digitizing either the first analog detector signal or the second analog detector signal to form a combined analog signal.

The present specification also discloses a detection system configured to reduce pileup signal contributions to detected signals comprising: a first detector system configured to detect incident radiation and output a first analog detector signal; at least one digitizer to digitize an analog signal to create a digitized output signal defined by a digitized output signal waveform; and, at least one processor configured to analyze the digitized output signal waveform to determine a presence or an absence of a pileup signal, wherein a shape of the digitized output signal waveform is indicative of the presence or the absence of the pileup signal and wherein the digitized signal is accepted if the pileup signal is absent or the digitized signal is rejected if the pulse pileup signal is present.

Optionally, the system further comprises a second detector system configured to detect incident radiation scattered by the first detector system, wherein the second detector system is positioned around the first detector system, wherein the second detector system is configured to output a second analog detector signal, and wherein a signal shape of the second analog detector signal differs from a signal shape of the first analog detector signal. Optionally, the system further comprises at least one summing circuit configured to combine the first analog detector signal and the second analog detector signal before digitizing either the first analog detector signal or the second analog detector signal to form a combined analog signal.

In some embodiments, the present specification describes a method for reducing pulse pileup contributions to spectra comprising: detecting incident radiation using a first detector system outputting a first detector signal; detecting incident radiation scattered by the first detector system using a second detector system circumferentially positioned around the first detector system, wherein the second detector system outputs a second detector signal, and wherein a signal decay time of the first detector signal differs from the signal decay time of the second detector signals; simultaneously digitizing combined output signals from each of the first detector system and the second detector system; and using at least one processor, analyzing the digitized signal, wherein a shape of the digitized signal is indicative of a presence or an absence of a pileup signal.

Optionally, the signal decay time of the second detector system is longer than the signal decay time of the first detector system.

Optionally, the signal decay time of the second detector system is shorter than the signal decay time of the first detector system.

Optionally, the signal decay time of the second detector system is the same as the signal decay time of the first detector system, and wherein the signal output from the second detector system is delayed relative to the signal output of the first detector system.

Optionally, the first detector system comprises one or more detectors.

Optionally, the second detector system comprises one or more detectors.

Optionally, analyzing the digitized signal comprises detecting a presence of a signal at a predefined time in the waveform, wherein the detected presence is indicative of at least one distortion signal.

Optionally, the presence of at least one distortion signal is indicative of the pulse pileup having occurred.

Optionally, the first detector system comprises a first scintillation material and the second detector system comprise a second scintillation material different from the first scintillation material.

Optionally, the first scintillation material has a first decay time and the second scintillation material has a second decay time longer than the first decay time.

Optionally, the first decay time is smaller than 50 ns and the second decay time is longer than 100 ns.

Optionally, the first scintillation material is one of: plastic scintillators, liquid scintillators, Cerium Bromide ($CeBr_3$), Lanthanum Bromide ($LaBr_3$), Lutetium Silicate (LSO), Lutetium Yttrium Ortho-Silicate (LYSO), and Lead Tungstate ($PbWO_4$).

Optionally, the second scintillation material is one of: Sodium Iodide (NaI), Cesium Iodide (CsI), Strontium Iodide (SrI), Cadmium Tungstate ($CdWO_4$), Bismuth Germanate (BGO), and liquid scintillator.

Optionally, the first scintillation material has a first decay time and the second scintillation material has a second decay time shorter than the first decay time.

Optionally, the first scintillation material has a first decay time and the second scintillation material has a second decay time equal to the first decay time.

Optionally, the signal decay time of the second detector signals is delayed with respect to the signal decay time of the first detector signal by passing the second detector signals through a coaxial cable having a predefined length, before the second detector signals are input to the digitizer.

Optionally, the predefined length of the coaxial cable provides a delay in the signal decay time of the second detector signals, wherein the delay is at least equal to the signal decay time of the first detector signal.

In some embodiments, the present specification discloses a system for reducing Compton scatter contributions to spectra comprising: a first detector system configured to detect incident radiation and output a first detector signal, the first detector system comprising at least one detector; a second detector system surrounding the first detector system and configured to detect incident radiation scattered by the first detector system and outputting a second detector signal, the second detector system comprising at least one detector being shaped as a funnel comprising a hollow interior open from one side for receiving the first detector system wherein the first detector system is surrounded by walls of the hollow interior, incident radiation being received by the first detector from the open side; and wherein a signal decay time of the first detector signal differs from the signal decay time of the second detector signal; and a digitizer configured to receive a single input consisting of combined output signals from each of the first detector system and the second detector system, wherein the digitizer is further configured to simultaneously digitize the signals to produce a digitized output waveform, and wherein a shape of the output waveform is indicative of a presence or an absence of a Compton scatter signal.

Optionally, a narrow solid end of the second detector system is coupled with a PMT.

Optionally, the first detector system comprises a first scintillation material and the second detector system comprises a second scintillation material different from the first scintillation material.

Optionally, the first scintillation material has a first decay time and the second scintillation material has a second decay time longer than the first decay time.

Optionally, the first decay time is smaller than 50 ns and the second decay time is longer than 100 ns.

Optionally, the first scintillation material is one of: plastic scintillators, liquid scintillators, Cerium Bromide ($CeBr_3$), Lanthanum Bromide ($LaBr_3$), Lutetium Silicate (LSO), Lutetium Yttrium Ortho-Silicate (LYSO), and Lead Tungstate ($PbWO_4$).

Optionally, the second scintillation material is one of: Sodium Iodide (NaI), Cesium Iodide (CsI), Strontium Iodide (SrI), Cadmium Tungstate ($CdWO_4$), Bismuth Germanate (BGO), liquid scintillator.

Optionally, the first scintillation material has a first decay time and the second scintillation material has a second decay time shorter than the first decay time.

Optionally, the first scintillation material has a first decay time and the second scintillation material has a second decay time equal to the first decay time.

Optionally, the signal decay time of the second detector signals is delayed with respect to the signal decay time of the first detector signal by passing the second detector signals through a coaxial cable having a predefined length, before the second detector signals are input to the digitizer.

Optionally, the predefined length of the coaxial cable provides a delay in the signal decay time of the second detector signals, wherein the delay is at least equal to the signal decay time of the first detector signal.

Optionally, the digitized output waveform is analyzed by using one or more of gated pulse shape discrimination (PSD) techniques.

Optionally, the shape of the output waveform is further indicative of a presence or an absence of a pulse pileup signal.

The aforementioned and other embodiments of the present specification shall be described in greater depth in the drawings and detailed description provided below.

BRIEF DESCRIPTION OF THE DRAWINGS

These and other features and advantages of the present specification will be appreciated, as they become better understood by reference to the following detailed description when considered in connection with the accompanying drawings, wherein:

FIG. 2D illustrates a fourth configuration for digitizing the signals of the first and second detectors shown in FIG. 1A, in accordance with an embodiment of the present specification;

FIG. 2E illustrates a configuration for digitizing the signals of the first detector of the pulse pileup detection system as shown in FIG. 1D, in accordance with an embodiment of the present specification;

FIG. 3A is a diagrammatical representation of another design of the Compton scatter detection system of the present specification, in accordance with an embodiment of the present specification;

FIG. 3B is another diagrammatical representation of the design of the Compton scatter detection system shown in FIG. 3A, in accordance with an embodiment of the present specification;

FIG. 9A shows a two-dimensional plot of gated PSD values vs. gamma-ray energy (E) corresponding to the signal obtained from only one of the second set of detectors 514 of the experimental setup shown in FIGS. 5A, 5B, in a high-intensity field of gamma rays.

DETAILED DESCRIPTION

Figure 1A:
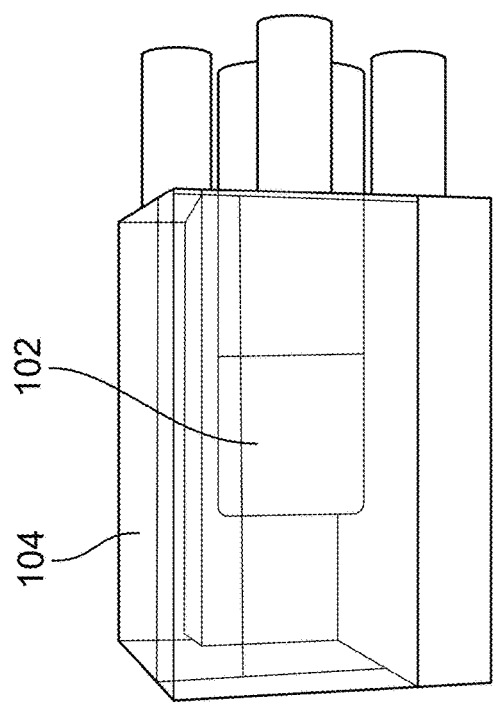
FIG. 1A is a diagrammatical representation of a Compton scatter detection system of the present specification in a first orientation, in accordance with an embodiment of the present specification.

The present specification describes a method of detecting Compton scattering and subsequently rejecting signals exhibiting Compton scattering. In an embodiment, the present specification provides a system for detecting Compton scatter in incident signals. In embodiments, the incident signals may be due to X-rays or gamma rays. In an embodiment, the present specification provides a first signal detector and a second Compton scatter detector configured to receive an incident signal, wherein one of the detector output signals is delayed before the detector signals are electronically coupled to one another. Detected signals from the first and the second detectors are combined into a single signal, which is then digitized and analyzed. In embodiments, the digitized signal is analyzed to determine a signal time coincidence in the first and the second detectors. If it is determined that the second detector detected a signal at the same time as the first detector, the occurrence of a Compton event is indicated and the signal is rejected, alternatively it is accepted.

The present specification also describes a method and system for detecting pulse pileup in incident signals and subsequently rejecting signals exhibiting pulse pileup. In embodiments, the incident signals may be due to X-rays or gamma rays. In an embodiment, the present specification provides a signal detector configured to receive an incident signal. The detected signal from the detector is then digitized and analyzed. In embodiments, the digitized signal is analyzed to determine a signal distortion due to the presence of pulse pileup. If it is determined that distortion is present, the occurrence of pulse pileup is indicated and the signal is rejected. Alternatively, if no distortion is present, the signal is accepted.

Further, in embodiments of the present specification, a first detector and a second detector may have different signal shapes versus time. In various embodiments, a signal shape is dependent on a signal decay time, a signal delay, or signal inversion. This is accomplished by at least one of the following methods: i) a short decay time for the first detector and a significantly longer decay time for the second detector (where "short" and "longer" are relative to one another and "significantly" refers to a factor by which the longer decay is longer than the shorter decay such that there is a sufficient difference visible in the PSD analysis of the digitized signal); ii) a short decay time for the second detector and a longer decay time for the first detector; and/or iii) the same decay time for the first and second detectors, wherein either the first detector or the second detector have their time signature changed, for example, by the use of a long cable or an electronic component or device that modifies the apparent signal shape versus time.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. In the description and claims of the application, each of the words "comprise" "include" and "have", and forms thereof, are not necessarily limited to members in a list with which the words may be associated.

It should be noted herein that any feature or component described in association with a specific embodiment may be used and implemented with any other embodiment unless clearly indicated otherwise.

In various embodiments, the system includes at least one processor capable of processing programmatic instructions, has a memory capable of storing programmatic instructions, and employs software comprised of a plurality of programmatic instructions for performing the processes described herein. In various embodiments, a computing device may be employed to receive and process data signals and image data and may include an input/output controller, at least one communication interface and a system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across a network of multiple computer systems and architectures. In some embodiments, execution of a plurality of sequences of programmatic instructions or code, which are stored in one or more non-volatile memories, enable or cause the CPU of the computing device to perform or enable various functions, processes and algorithms, such as, for example, performing image reconstruction for display on a screen. In alternate embodiments, hard-wired circuitry may be used in place of, or in combination with, software instructions for implementation of the processes of systems and methods described in this application. Thus, the systems and methods described are not limited to any specific combination of hardware and software.

FIG. 1A illustrates a diagrammatical representation of a Compton scatter and pulse pileup detection system of the present specification in a first orientation, in accordance with an embodiment of the present specification. A first detector 102 is surrounded with at least one second detector, and in an embodiment, a plurality of second detectors 104 on four sides of the first detector 102, as shown in FIG. 1A. It should be noted that, in embodiments for detecting pulse pileup, only a first detector is required. For example, FIG. 1D shows only a first detector 102 for a pulse pileup detection system. Additional detectors may be added, but are not necessary for pulse pileup detection. In an embodiment, additional detectors (not shown) are placed behind the first detector 102. Therefore, referring again to FIG. 1A, the first detector 102 is placed within a hollow cavity formed by one or more second detectors 104. The hollow cavity is open from at least one side and receives incident radiation for detection by the first detector 102. In various embodiments, the first detector 102 may be of a cylindrical shape or any other shape suitable for detecting incident radiation. In various embodiments, the first detector 102 includes one or more detectors of any shape. Similarly, in various embodiments, the second set of detectors 104 may include one or more detectors of any shape suitable for surrounding the first detector 102 in order to detect scattered signals from detector 102. In embodiments, the first detector and second detector(s) may be of any shape as long as the second detector(s) cover the area of the first detector through which scattered radiation, occurring in the first detector, can escape such that the scattered radiation is detected by the second detector(s).

In addition, one side of the first detector is not covered by second detector(s) and serves as the side in which incident radiation can enter the first detector without being detected by the second detector(s), and thus provide the overall suppressed signal. Thus, in various embodiments, any suitable number of detectors may be placed in any configuration in the Compton detection system, such that the second set of detector(s) 104 are of a sufficient active area to cover most angles in which the Compton scatter can occur; and wherein the second set of detectors 104 do not intercept the primary radiation incident on the first detector 102. The configuration shown in FIG. 1A is only exemplary. In embodiments, a first detector system is surrounded by a second detector system. Each of the first and second detector systems may include one or more detectors. FIG. 1A illustrates a specific embodiment where the first detector system includes one detector 102 and the second detector system includes four detectors 104 on the four sides surrounding the first detector 102.

In various embodiments, the second set of detectors 104 is placed around the first detector 102 in a manner such that detectors 104 can intercept the Compton scattering of the incident gamma rays, wherein the scattering occurs in multiple directions. For example, in an embodiment, second set of detectors 104 comprises four discrete, rectangular detectors that surround the first detector 102. In various embodiments, the second detectors 104 are placed at a suitable distance from the detector 102 such that detectors 104 capture all rays (or at least as many as possible) scattered from the detector 102 in multiple directions. In various embodiments, the effectiveness of the Compton detection system is directly proportional to the coverage area provided by the second detectors 104 for capturing the rays scattered in all directions. Hence, if scattered rays are only partly captured, the system would only result in partial Compton suppression.

Thus, the plurality of second detectors 104 form an enclosure around first detector 102, with an opening provided on at least one end so as to not intercept the primary X-ray or gamma-ray before it reaches the first detector 102.

In an embodiment, the first detector 102 comprises a scintillator layer fabricated from materials having a relatively short signal decay time, as compared to the decay time of the second set of detectors 104. In various embodiments, the factor by which the signal decay time of the first detector 102 differs from the second set of detectors 104 is such that the difference is visible in a Pulse Shape Discrimination (PSD) analysis of the digitized output signals of the detectors. In an embodiment, the set of second detectors 104 comprise scintillation layers fabricated from materials having a relatively long signal decay time. Scintillation materials with relatively short decay times (less than about 50 ns) include, but are not limited to plastic scintillators, liquid scintillators, Cerium Bromide ($CeBr_3$), Lanthanum Bromide ($LaBr_3$), Lutetium Silicate (LSO), Lutetium Yttrium Ortho-Silicate (LYSO), and Lead Tungstate ($PbWO_4$). Scintillation materials having relatively long decay times include, but are not limited to Sodium Iodide (NaI), Cesium Iodide (CsI), Strontium Iodide (SrI), Cadmium Tungstate ($CdWO_4$), Bismuth Germanate (BGO), and liquid scintillator. During operation, an incident signal may either be completely absorbed by the first detector 102, or may be partially absorbed by the first detector 102 and partially scattered, wherein the scattered signal may be absorbed by the plurality of second detectors 104.

In another embodiment, the first detector 102 comprises a scintillator layer made of material having a relatively long signal decay time, which in an embodiment is more than 100 ns; while the second detectors 104 comprise scintillation layers made of materials having a relatively short signal decay time, which in an embodiment is less than 50 ns. In various embodiments, the decay times are relative. By way of example, a decay time for $PbWO_4$ is 8 ns; a decay time for LYSO it is 40 ns; a decay time for CeBr it is 90 ns; a decay time for NaI it is 200 ns; and a decay time for $CdWO_4$ it is 15,000 ns. NaI has a relatively long decay time when used in conjunction with CeBr in detection systems, which has a relatively short decay time compared to NaI.

In yet another embodiment, both the first detector 102 and second detectors 104 comprise scintillation layers made of the same materials (or materials with similar decay times). In this embodiment, the detection signal obtained from the second detectors 104 is delayed and then coupled with the detection signal obtained from first detector 102. In an embodiment a long coaxial cable is used to delay the detection signal obtained from the second detector 104 before the signal is coupled with the signal from the first detector 102. In various embodiments, the length of the coaxial cable is such that the delay caused by the cable is similar to the shortest decay time of the scintillation material(s) used in first and second detectors. In an embodiment, a cable length of ~10 meters is used, leading to a delay of approximately 50 ns. In doing so, the second detectors 104 are able to detect any Compton scatter occurring in first detector 102 at a relatively later time, since the signal from the second detectors 104 is delayed due to travel through the long cable before being coupled with the signal from first detector 102. When the combination of the two signals is fed to a digitizer, the signal from second detectors 104 appears at a tail end of the signal from first detector 102. This alters the shape of the combined pulse obtained at the digitizer, indicating the presence of Compton scatter in the detected signals.

In another embodiment, a long coaxial cable (having a length as described above) is used to delay the detection signal obtained from the first detector 102 before the signal is coupled with the signal from the second detector 104. In various embodiments, the use of a long coaxial cable introduces a delay of approximately 1 ns per 20 cm of cable used, and also causes a change in the shape of the signal (either from the first detector 102 or the second detector 104) that is transmitted through the cable. This is because of the inherent capacitance, inductance, and impedance of the cable which either enhances or reduces one or more components of the signal frequency.

In various embodiments of the present specification Compton scatter is detected by analyzing the waveforms detected by the first and the second set of detectors by using standard techniques of pulse shape discrimination, as is described later.

In yet another embodiment, the detection signal obtained from the second detectors 104 is inverted by using devices such as, but not limited to, an inverting amplifier or a buffer. The inverted signal is then coupled with the signal obtained from first detector 102 and is digitized. The inversion of the signal causes a change in the shape of the resultant digital signal waveform. Hence, in various embodiments, there is a difference between the waveform of the digitized signal when there is a detected Compton scatter event in second detectors 104 and the waveform of the digitized signal when there is no detected Compton scatter event. This difference enables detection of Compton scatter by analyzing the waveform by using standard techniques of pulse shape discrimination, as is described in later sections of the specification.

Figure 1B:
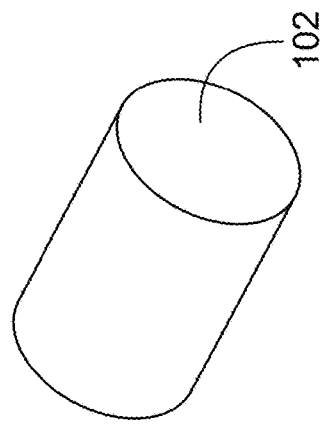
FIG. 1B is a diagrammatical representation of the Compton scatter detection system of FIG. 1A in a second orientation, in accordance with an embodiment of the present specification.
Figure 1C:
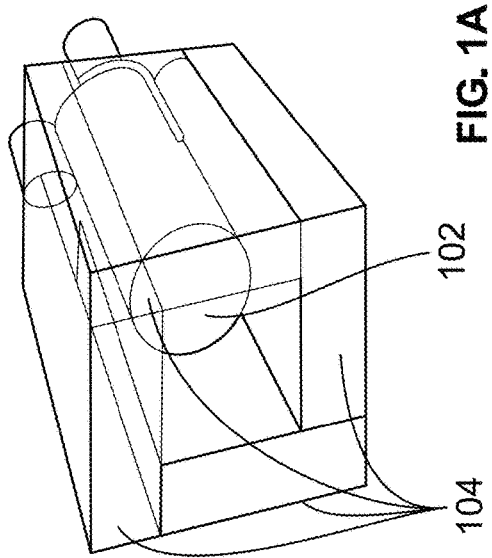
FIG. 1C is a diagrammatical representation of a Compton scatter detection system of FIG. 1A in a third orientation, in accordance with an embodiment of the present specification.
Figure 1D:
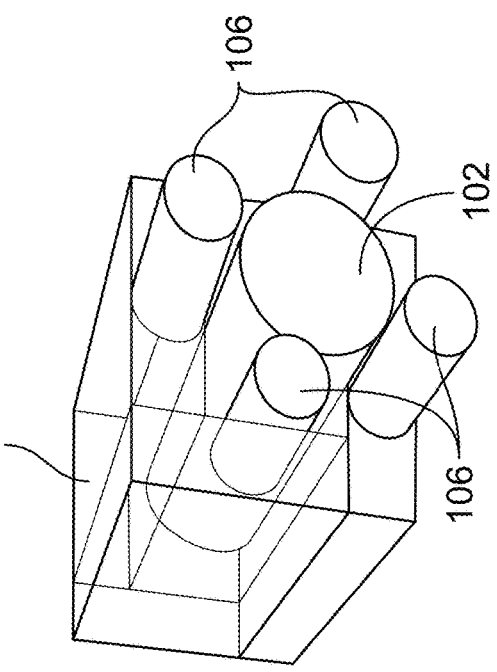
FIG. 1D is a diagrammatical representation of a first detector of a pulse pileup detection system of the present specification, in accordance with an embodiment of the present specification.

FIG. 1B illustrates a diagrammatical representation of the Compton detection system of FIG. 1A in a second orientation, in accordance with an embodiment of the present specification. FIG. 1C illustrates a diagrammatical representation of a Compton detection system of FIG. 1A in a third orientation, in accordance with an embodiment of the present specification. As shown in FIGS. 1A, 1B and 1C, detector 102 is cylindrically shaped and is surrounded by four detectors 104. In the alternative, in various embodiments, detector 102 may include one or more detectors, which can be of any shape. In embodiments, detectors 104 are rectangularly-shaped in order to completely cover the area around detector 102 for capturing the rays scattered by the detector 102. Detectors 104, in embodiments, further comprise protruding cylindrical portions 106 which comprise a photomultiplier tube (PMT), or other optical photon detector(s) to convert scintillation light into an electronic signal; a device that distributes high voltage to various dynodes of the PMT if required; and other electronic components that may be required to provide the electronic signal. In other embodiments, the detector(s) 104 is a single detector or two or more detectors that may be designed in other suitable shapes. For example, in an alternative embodiment, both the detector 102 and detectors 104 may be rectangular in shape. In yet another alternative embodiment, detectors 104 are cylindrical in shape. In an embodiment, detector 102 comprises a cylindrical portion at one (or both) end(s) for coupling with one or more PMTs or other optical photon detectors to convert the scintillation light into an electronic signal; one or more devices that distribute high voltage to various dynodes of the PMT(s) if required; and other electronic components that may be required to provide the electronic signal.

Figure 2A:
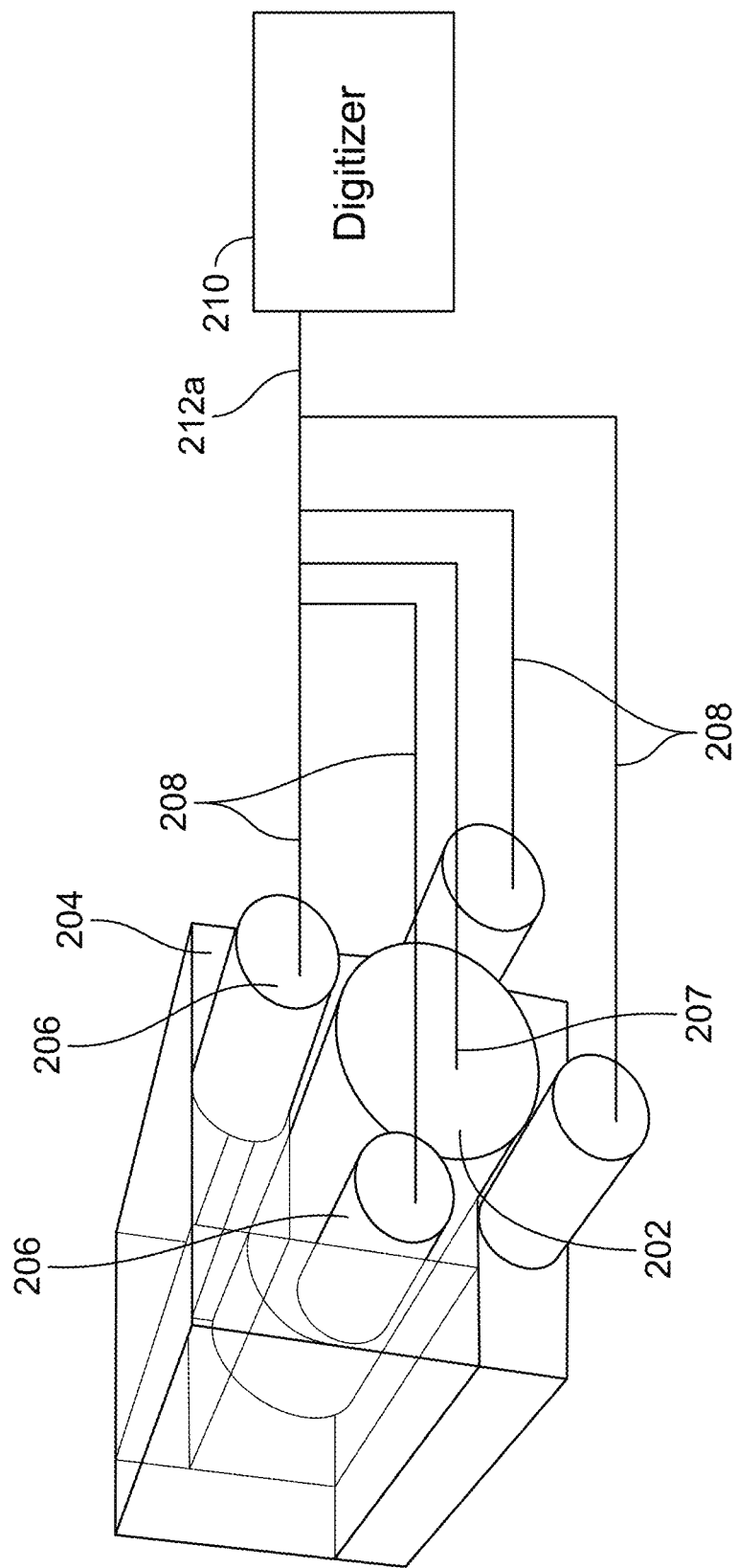
FIG. 2A illustrates a first configuration for digitizing the signals of the first and second detectors as shown in FIG. 1A, in accordance with an embodiment of the present specification.

In an embodiment, the signals detected by the first detector and the second set of detectors are combined, digitized, and analyzed to determine coincidence. FIG. 2A illustrates a first configuration for digitizing the signals of the first detector 202 and second detectors 204 (shown in FIG. 1A as 102 and 104, respectively), in accordance with an embodiment of the present specification. In various embodiments, a signal is conveyed from the detectors to a digitizer by using at least one cable having connectors provided at each end; wherein the signal is propagated through one conductor of the cable, while the other conductor of the cable is grounded. Exemplary cables include but are not limited to, coaxial cables with industry-standard BNC connectors on both ends, wherein the signal is propagated through a central conductor of the cable and an outer conductor is grounded. The BNC standard includes T-shaped adapters which allow connecting multiple such cables together. It should be understood that with reference to transmission of signals throughout the specification, that at least one cable is used for transmitting said signal.

As shown in FIG. 2A, a first detector 202 is surrounded by a plurality of second detectors 204. A signal output 207 of the first detector 202 and signal outputs 208 of the plurality of second detectors 204 (optionally, via cylindrical portions 206, which are employed to convert scintillation light into an electronic signal) are conveyed via cables and combined into a signal output 212a using, for example, said T-shaped adapters, or other suitable means of physically connecting the various signal cables together. Signal output 212a is fed to a signal input of digitizer 210 for digitization. This approach eliminates the need for separate digitization and analysis circuitry for each detector. In an embodiment, the digitized signal is stored temporarily in the digitizer 210 and then read out by a processor (not shown in the FIG.) comprising data acquisition software, used to analyze the digitized signal. In another embodiment, the digitized signal is read out from the digitizer 210 by a processor (not shown in the FIG.) and recorded onto permanent storage for analysis by data acquisition software at a later time. In yet another embodiment, the digitizer 210 is integrated into a single unit that also comprises a processor/computer and data acquisition software to analyze the signal. The analyzed signals may then be read/acquired by any computing device.

Figure 2B:
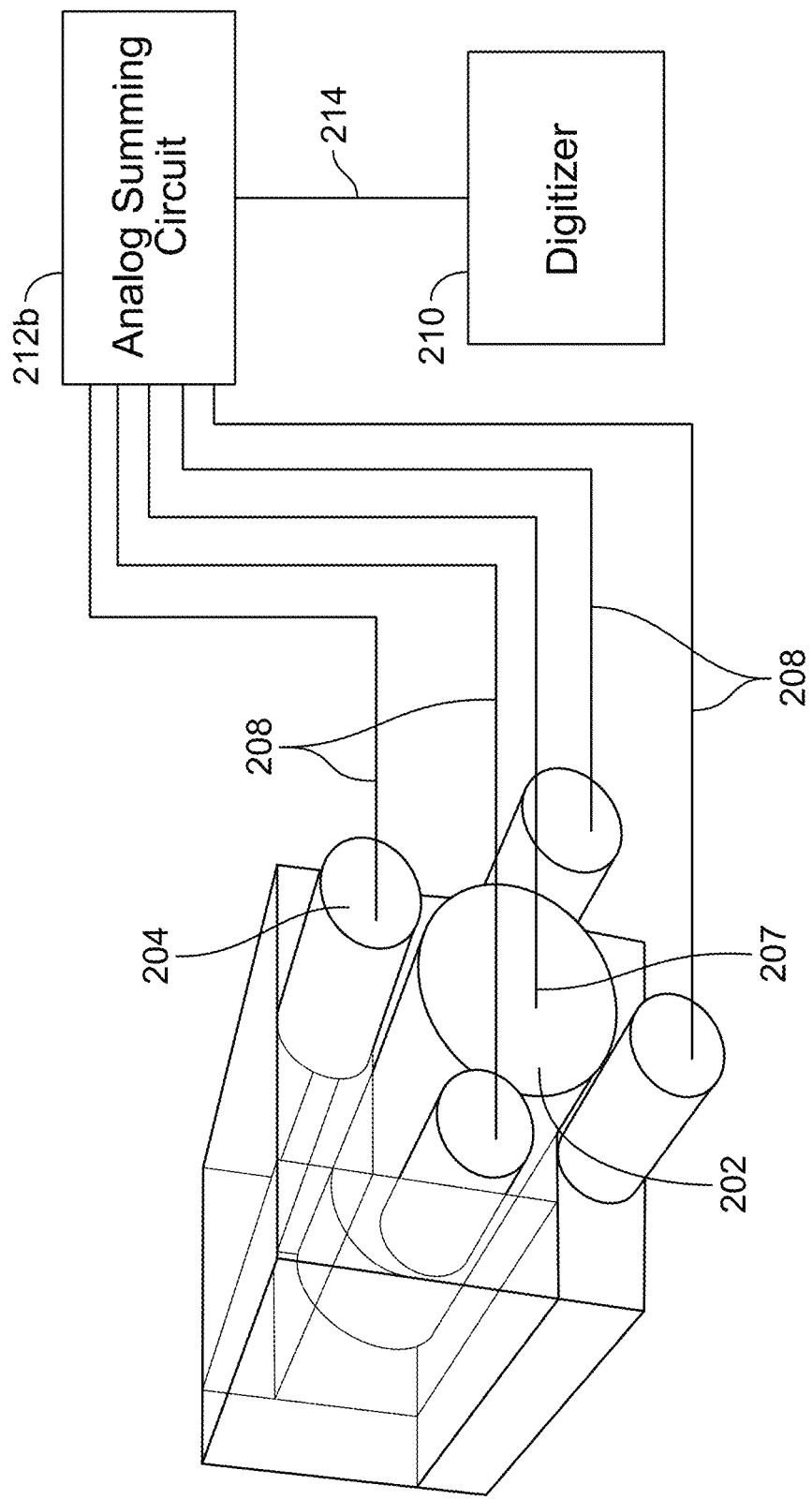
FIG. 2B illustrates a second configuration for digitizing the signals of the first and second detectors shown in FIG. 1A, in accordance with an embodiment of the present specification.

FIG. 2B illustrates a second configuration for digitizing the signals of the first and second detectors shown in FIG. 1A, in accordance with an embodiment of the present specification. As shown in FIG. 2B, an analog signal output 207 of the first detector 202 and analog signal outputs 208 of the plurality of second detectors 204 are fed, using cables such as, but not limited to the examples of cables described above, to an analog summing circuit or signal combination wiring 212b which combines said signals into a single output signal 214, which is then fed to the digitizer 210 for digitization and subsequent waveform analysis as described above. Analog summing circuits are known in the art and may also be referred to as summing amplifiers or fan-in units. Such devices have an output channel that provides a sum of signals of the input channels.

In an embodiment, the signal output by a second set of detectors is delayed by a predefined time period (for example, by using a long cable), which separates the signal output by a second set of detectors in time from the signal output by a first detector, in order to enable waveform analysis. When the signal shapes of the first detector and the second set of detectors are not distinct, delaying the signal of either the first detector or the second set of detectors is an advantage, in that when a Compton scatter is present and detected in the second set of detectors the signal of the delayed (set of) detector(s) will show up later in the combined signal waveform and will thus be recognized as a distortion of the waveform that is incompatible with the signal being only due to the not-delayed (set of) detector(s).

Figure 2C:
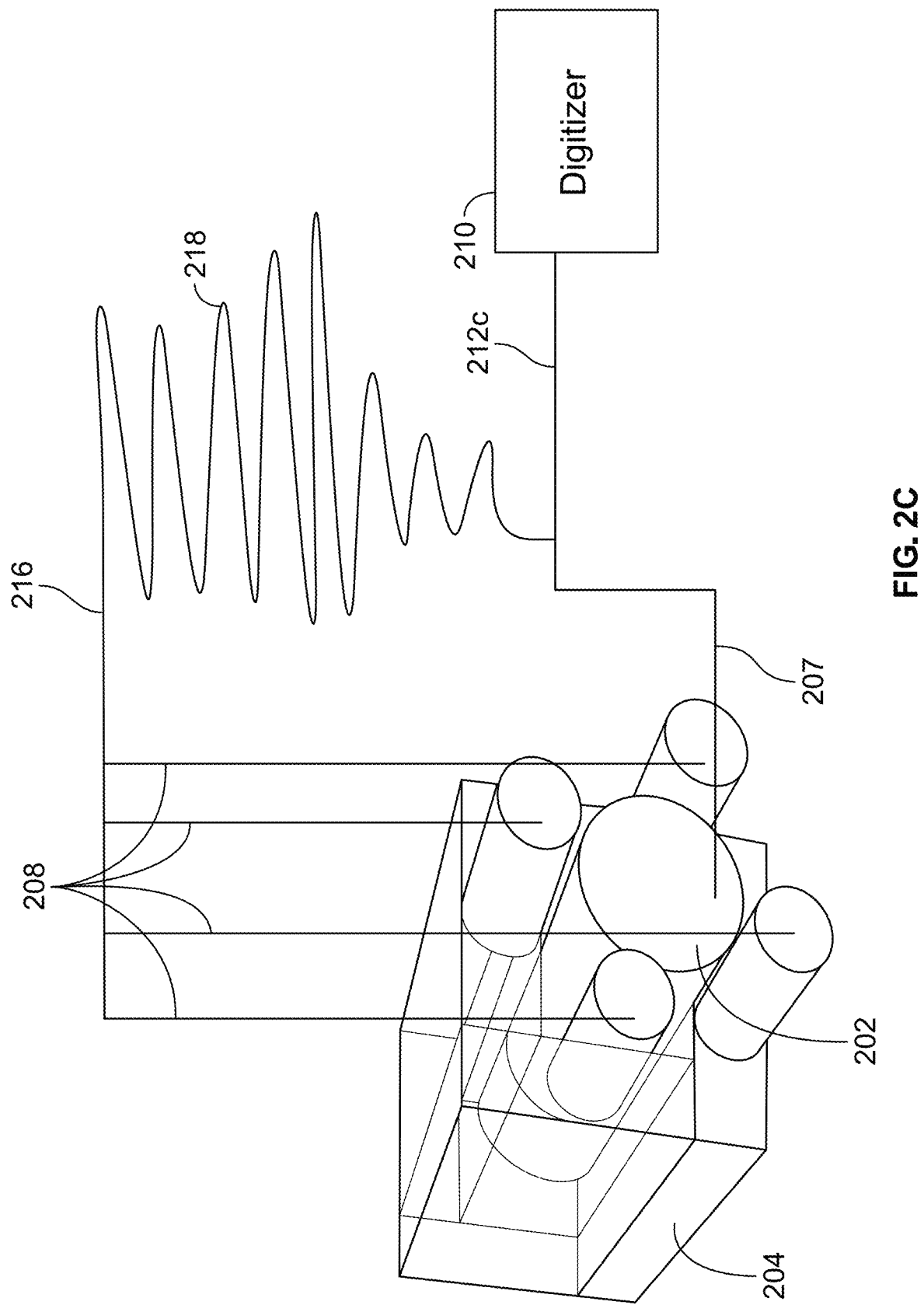
FIG. 2C illustrates a third configuration for digitizing the signals of the first and second detectors shown in FIG. 1A, in accordance with an embodiment of the present specification.

FIG. 2C illustrates a third configuration for digitizing the signals of the first and second detectors shown in FIG. 1A, in accordance with an embodiment of the present specification. As shown in FIG. 2C, signal outputs 208 of the plurality of second detectors 204 are conveyed via cables and combined into a single signal output 216 using, for example, said T-shaped adapters, or other suitable means of physically connecting the various signal cables together. The combined signal 216 is then routed through a coaxial cable 218 and connected to the signal 207 of the first detector 202 to obtain a combined signal 212c, which is then fed to the digitizer 210 for digitization and subsequent analysis as described earlier. The length of cable 218 is sufficiently long as to provide for a measurable delay in the transmission of the signals of the second detectors relative to the first detector. In various embodiments, a measurable delay may be interpreted as a delay in the transmission of the signals of the second detectors relative to the first detectors that causes a difference between Compton-scattered and non-scattered signals, which in turn, leads to a statistically separable difference in the PSD analysis of the digitized signal, (FIG. 7), as may be inferred by a person of skill in the art of PSD analysis. A cable delays a signal by approximately 1 ns per 20 cm of cable used. Therefore, in various embodiments, cable 218 causes a delay in transmission of signal 216 comparable to the shorter decay time of the two scintillation materials used in the first detector 202 and second detectors 204. In an embodiment cable 218 causes a delay in transmission of signal 216 that ranges from 0.1 to 10 times of the shorter decay time. For example, if the decay time of the scintillation material used in first detector 202 is 100 ns, and the decay time of the scintillation material used in second detectors 204 is 200 ns, cable 218 having a length ranging from 2 m-200 m causes a delay in transmission of signal 216 that ranges from 10 to 1000 ns. In an embodiment, a cable having a length of approximately 10 m is used to obtain a signal transmission delay of approximately 50 ns. In an alternative embodiment, the configuration shown in FIG. 2C may also be implemented by using one or more analog summing circuits, such as analog summing circuit 212b.

FIG. 2D illustrates a fourth configuration for digitizing the signals of the first and second detectors shown in FIG. 1A, in accordance with an embodiment of the present specification. As shown in FIG. 2D, signal outputs 208 of the plurality of second detectors 204 are conveyed via cables and combined into a signal output 216 using, for example, said T-shaped adapters, or other suitable means of physically connecting the various signal cables together. Combined signal 216 is then fed to an inverting amplifier 220 to obtain an inverted signal 224. In an embodiment, the inverted signal is further passed through an attenuator 228 to obtain attenuated signal 232. In an embodiment, the signal 207 of the first detector 202 is fed to a non-inverting amplifier 222 (via a cable) to obtain a non-inverted signal 226. In an embodiment, the non-inverted signal is further passed through an attenuator 230 to obtain attenuated signal 234 which is combined with the attenuated signal 232 by using a T-adapter or other suitable means of physically connecting or enabling communication of the two signals and fed into cable 212d which is then fed to digitizer 210 for digitization and eventual analysis as described earlier. In embodiments, attenuators 228 and 230 serve to both decrease the signals 224, 226 to make the signals suitable for the input range of the digitizer 210 and to prevent oscillations in amplifiers 220 and 222 which may occur if the outputs of amplifiers 220 and 222 are connected together directly. In an embodiment, amplifier 220 is configured to invert the signal 216 while amplifier 222 is configured not to invert the signal 207. The advantage of this configuration is that only signal 207 from first detector 202 triggers the digitizer 210, and any isolated signals 216 from second detectors 204 do not trigger the digitizer 210 as inverted signals 224 have a polarity that is opposite to the polarity of signals 207 fed to the non-inverting amplifier 222.

FIG. 2E illustrates a configuration that may be employed for digitizing the signals generated by the first detector 202 of the pulse pileup detection system as shown in FIG. 1D, in accordance with an embodiment of the present specification. As shown in FIG. 2E, a signal output 207 of the first detector 202 is fed to a signal input of a digitizer 210 for digitization. In an embodiment, the digitized signal is stored temporarily in the digitizer 210 and then read out by a processor (not shown in the FIG.) comprising data acquisition software, used to analyze the digitized signal. In another embodiment, the digitized signal is read out from the digitizer 210 by a processor (not shown in the FIG.) and recorded onto permanent storage for analysis by data acquisition software at a later time. In yet another embodiment, the digitizer 210 is integrated into a single unit that also comprises a processor/computer and data acquisition software to analyze the signal. The analyzed signals may then be read/acquired by any computing device.

In various embodiments, referring to FIGS. 1A, 1B, 1C, and FIGS. 2A, 2B, 2C, 2D, if Compton scatter occurs at the first detector 202, and the scattered signal is absorbed by the second set of detectors 204, the combined (or summed) digitized output signal displays a signal shape modification indicating signal detection by the second set of detectors 204. In some embodiments, the signal shape modification comprises a signal in the shape of a tail to the digitized signal that would not be present if there was no Compton scatter detected in detectors 204. In various embodiments, pulse shape discrimination methods are used to analyze the digitized signal for determination of Compton scatter.

FIGS. 3A and 3B are diagrammatical representations of a Compton detection scatter system, in accordance with another embodiment of the present specification. A first detector 302 which is coupled with a PMT 307 is surrounded with a second detector 304 which is coupled with a PMT 306 as shown in FIG. 3A. In an embodiment, the second detector 304 is shaped as a hollow funnel into which the rectangular-shaped solid first detector 302 is inserted and positioned, as shown in FIGS. 3A, 3B, in a manner such that second detector 304 can intercept the Compton scattering of the X-rays/gamma-rays incident on a face 308 of the first detector 302, wherein the scattering occurs in multiple directions. In an embodiment, a broad end 304a of the second detector 304 has a diameter of approximately 10 inches and a narrow end 304b, which is coupled with the PMT 306, has a diameter of approximately 5 inches. Long and short edges 302a, 302b of the first detector 302 measure approximately 4 inches and 3.5 inches, respectively. Removable voltage dividers 310, 312 are coupled with the PMT 306 of the second detector 304 and the PMT 307 of the first detector 302, respectively.

Figure 3D:
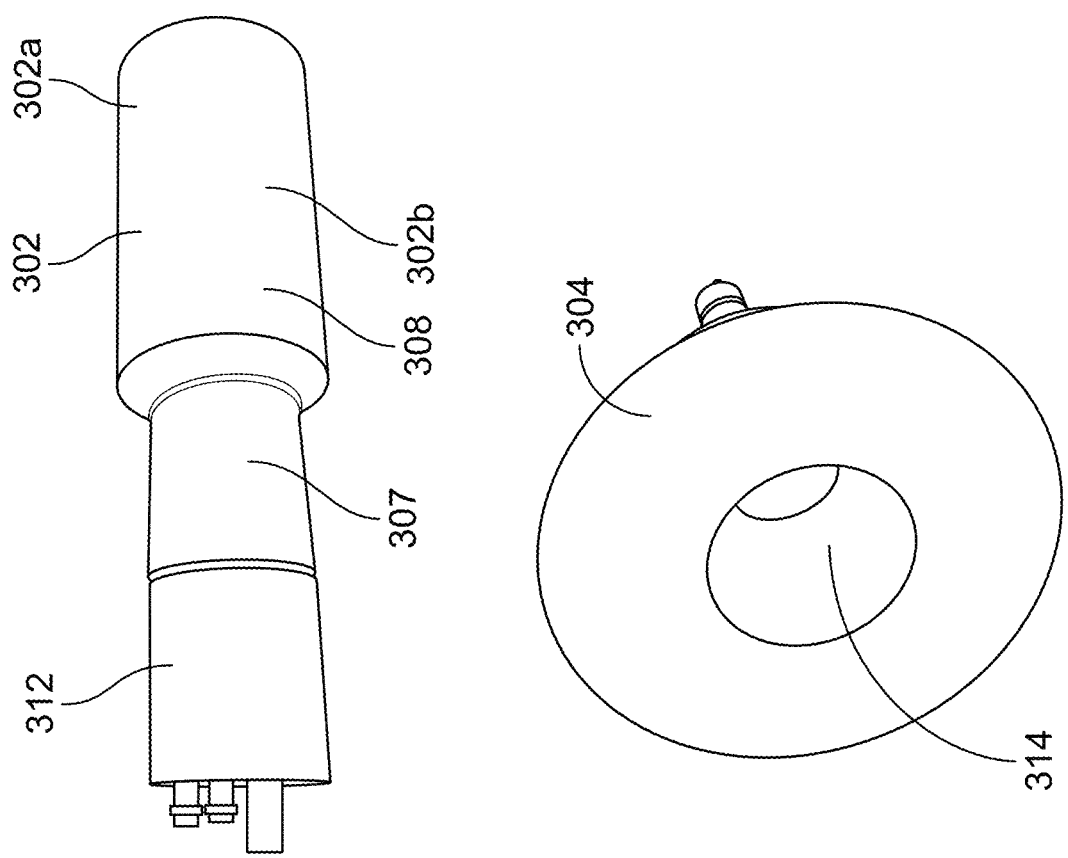
FIG. 3D illustrates another view of the funnel shaped second detector shown in FIGS. 3A and 3B, in accordance with an embodiment of the present specification.
Figure 3C:
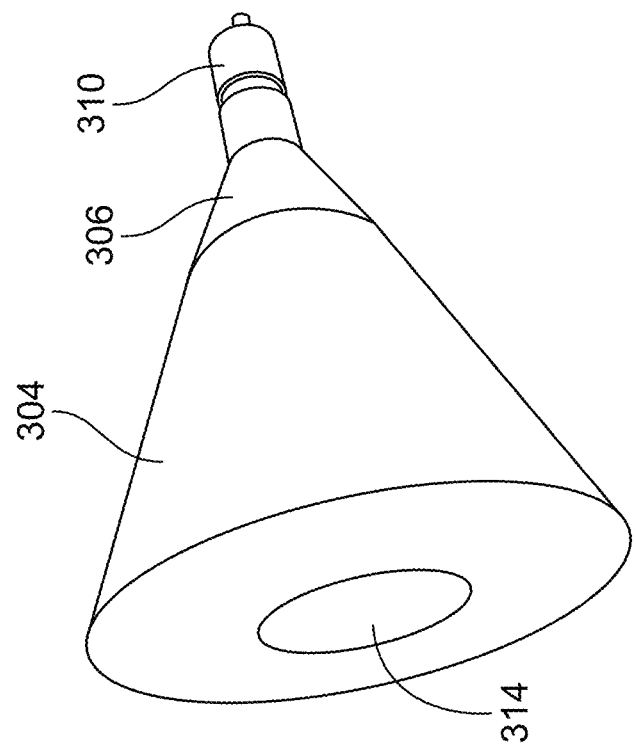
FIG. 3C illustrates a view of the funnel shaped second detector shown in FIGS. 3A and 3B, in accordance with an embodiment of the present specification.

FIGS. 3C and 3D illustrate views of the funnel-shaped second detector shown in FIGS. 3A, 3B. In embodiments, the funnel shaped detector 304 contains a liquid scintillator. In some embodiments, the liquid scintillator is known to those skilled in the art as EJ-309. In some embodiments, the first detector 302 is fabricated with a scintillating $CeBr_3$ crystal. As can be seen in FIGS. 3C and 3D, the second detector 304 comprises a hollow space 314 for accommodating the first detector 302, such that the detector 304 is surrounding the detector 302 from all sides, and only one face 308 of the detector 302 is open to receive incident rays as shown in FIG. 3A.

Figure 3E:
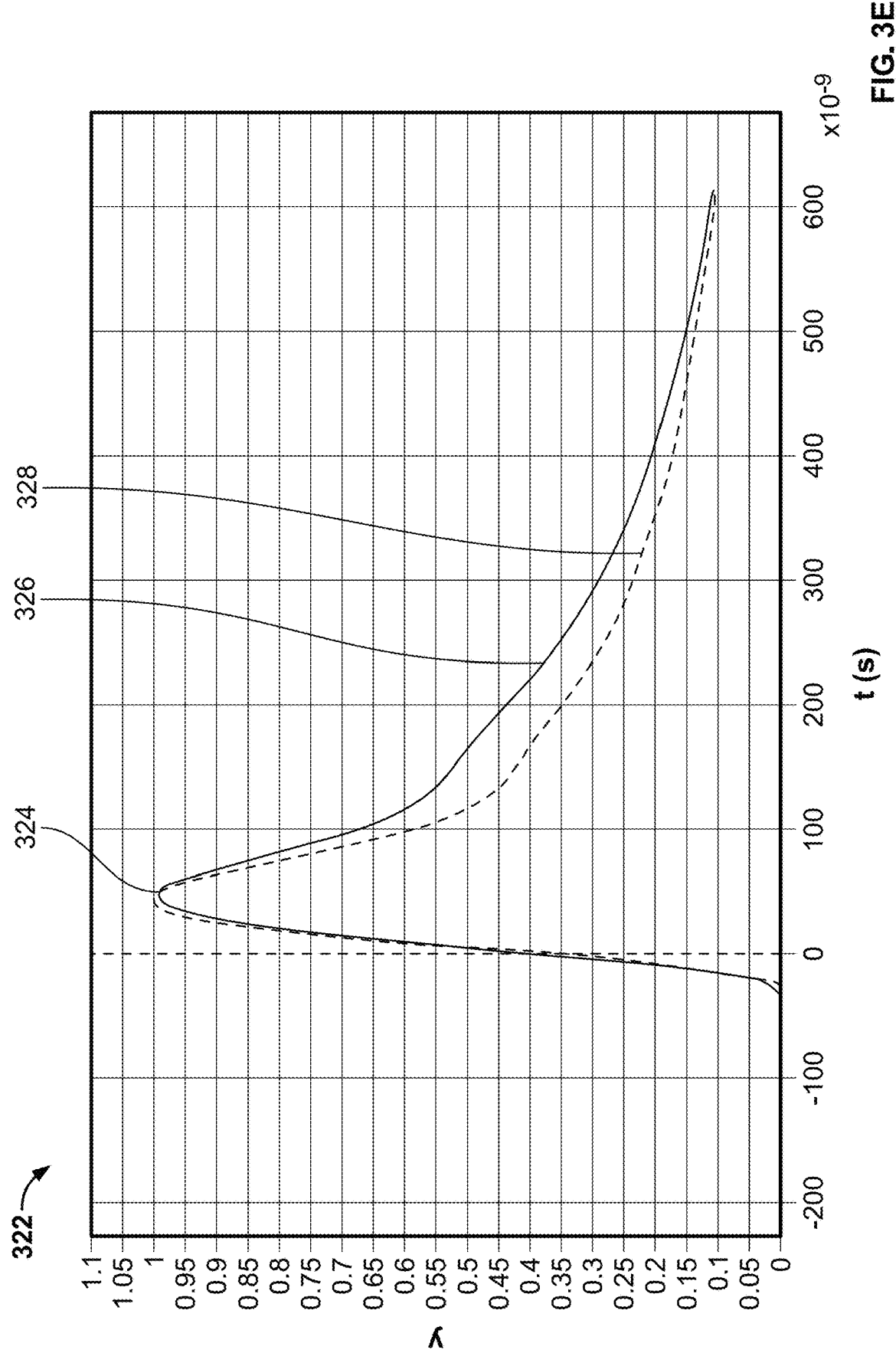
FIG. 3E illustrates digitized signal outputs of the Compton detection systems shown in FIGS. 2A-2D indicating the presence or absence of Compton scatter, in accordance with an embodiment of the present specification.

FIG. 3E illustrates digitized signal outputs of the Compton detection systems shown in FIGS. 2A-2D indicating the presence or absence of Compton scatter, in accordance with an embodiment of the present specification. Referring to FIGS. 2A-D, signal 322 comprises a peak 324 and a long or high tail 326 indicating incident signals being scattered by the first detector 202 and the scattered signals being absorbed by the plurality of second detectors 204. Alternatively, signal 322 comprises a peak 324 and a shorter or lower tail 328 indicating that there are no signals being scattered by the plurality of second detectors 204. In various embodiments, a signal output 322 that differs significantly from the expected signal of first detector 202 in any way, and especially in the tailing part of the signal, is rejected as said modified signal shape indicates occurrence of Compton scatter. Some small differences in signal shapes may be statistical in nature and/or due to electronic noise and are not considered indicative of presence/absence of Compton scatter. Further, differences in the overall signal amplitude are also not considered as shape differences indicative of presence/absence of Compton scatter.

Figure 4A:
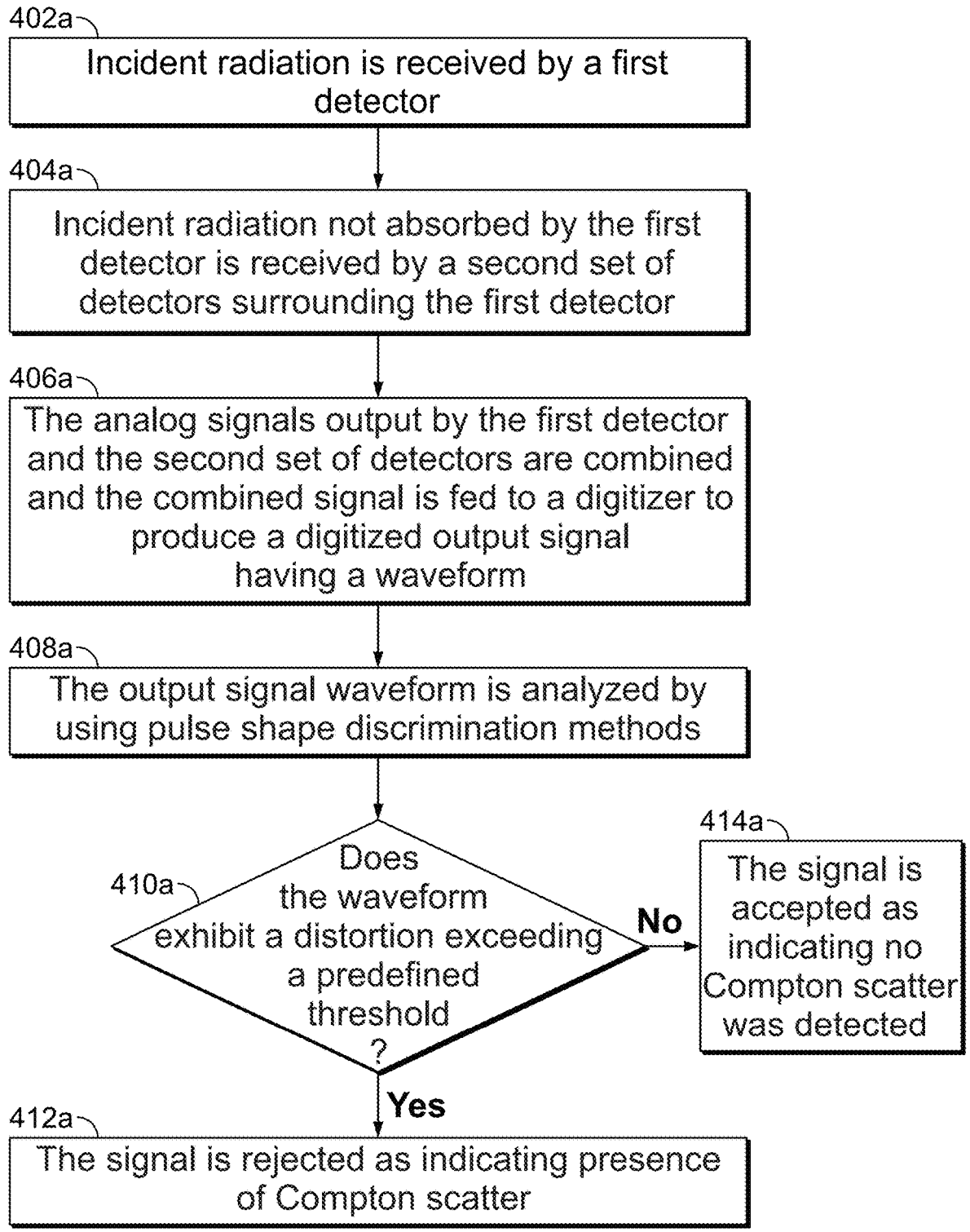
FIG. 4A is a flowchart illustrating a method for detecting Compton scatter using the Compton detection system of the present specification, in accordance with an embodiment of the present specification.

FIG. 4A is a flowchart illustrating a method for detecting Compton scatter, in accordance with an embodiment of the present specification. At step 402a, incident radiation is received by a first detector. In embodiments, the incident radiation may be X-rays or gamma rays impinging on an X-ray detector or a gamma ray detector. At step 404a incident radiation that is not absorbed by the first detector, is received by a second set of detectors surrounding the first detector, wherein the first detector comprises a first scintillation material and the second detector comprises a either a second, different scintillation material, or the same scintillation material as the first detector either with an added signal delay or signal inversion as described earlier. At step 406a, the analog signals output by the first detector and the second set of detectors are combined and fed to the input of a digitizer to produce a digitized output sampled signal defined by, or having a waveform as an attribute of the signal. In an embodiment, the analog signals output by the first detector and the second set of detectors are first summed by an analog summing circuit and then the summed signal is fed to the digitizer to produce the digitized output sampled signal with waveform. At step 408a the output signal waveform is analyzed by using pulse shape discrimination methods. At step 410a it is determined if the waveform comprises a tailing end such as tail 326 shown in FIG. 3E, or any other distortion incompatible with the signal being due to the first detector alone. At step 412a if the output signal waveform comprises a tail or distortion the signal is rejected as indicating presence of Compton scatter due to coincidence of detection by the first detector and the second set of detectors. At step 414a if the output signal waveform does not exhibit a tail or distortion as shown in tail 326 in FIG. 3E, the signal is accepted as indicating no Compton scatter was detected. In another embodiment, if the output signal waveform comprises a tail or distortion the waveform is rejected as indicating presence of Compton scatter due to coincidence of detection by the first detector and the second set of detectors. In another embodiment, if the output signal waveform does not exhibit a tail or distortion as shown in tail 326 in FIG. 3E, the waveform is accepted as indicating no Compton scatter was detected. In combination with many other events due to incident radiation that are selected using step 414a, a Compton-suppressed spectrum can be formed by histogramming the energies of the digitized signals. As is well-known in the art, the energy of said digitized signal is obtained by summing all relevant samples of the digitized signal, and multiplying the result with a calibration constant.

Figure 4B:
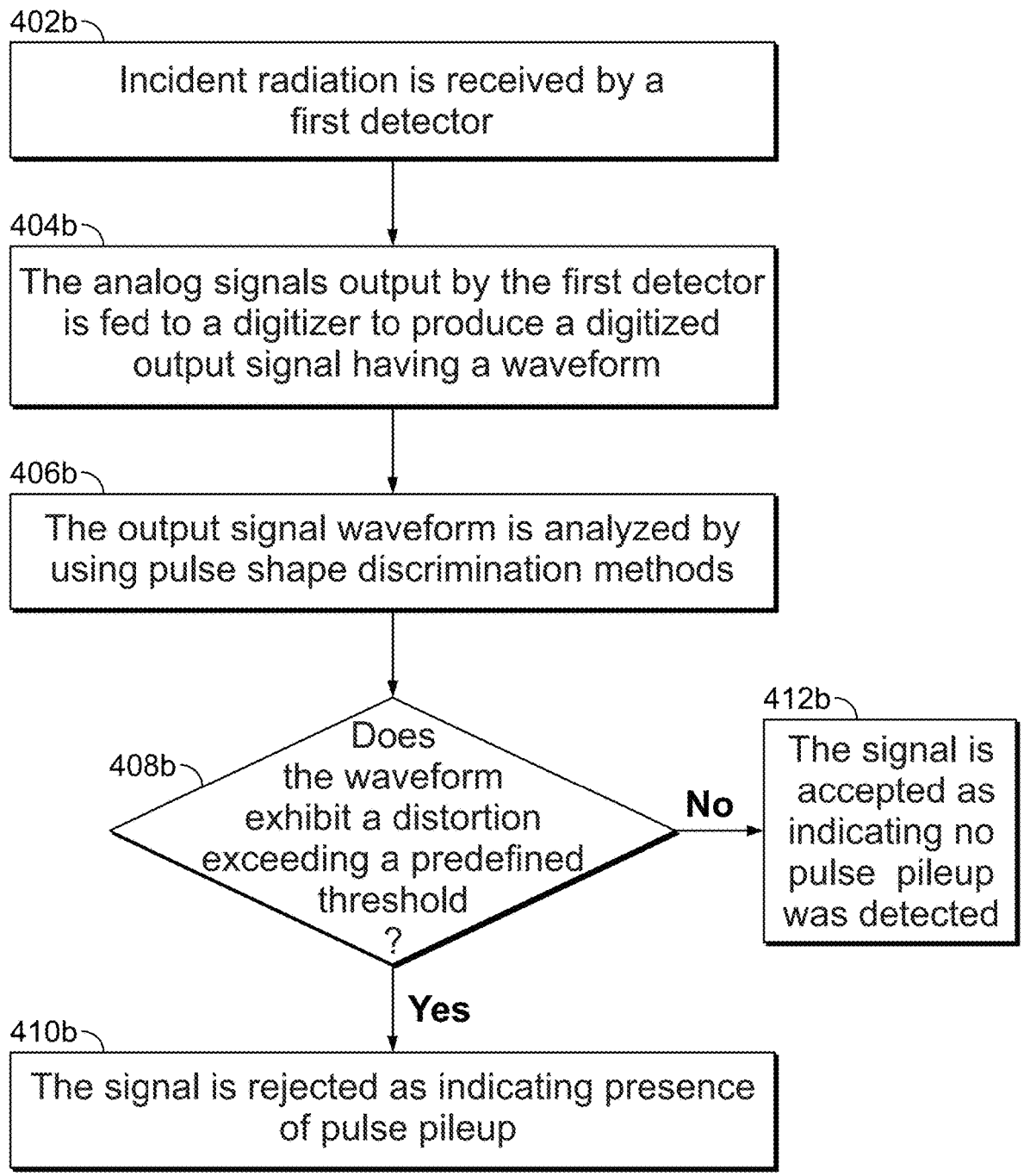
FIG. 4B is a flowchart illustrating a method for detecting pulse pileup using the detection system of the present specification, in accordance with an embodiment of the present specification.

In an embodiment, systems provided by the present specification are also used to detect and subsequently reject pulse pileup in incident signals. In embodiments, the incident signals may be due to X-rays or gamma rays. FIG. 4B is a flowchart illustrating a method for detecting pulse pileup, in accordance with an embodiment of the present specification. At step 402b, incident radiation is received by a first detector. In embodiments, the incident radiation may be X-rays or gamma rays impinging on an X-ray detector or a gamma ray detector. At step 404b, the analog signals output by the first detector are fed to the input of a digitizer to produce a digitized output sampled signal defined by, or having a waveform as an attribute of the signal.

In an embodiment, the analog signals output by the first detector are first summed by an analog summing circuit and then the summed signal is fed to the digitizer to produce the output sampled signal/waveform. At step 406b the output signal waveform is analyzed by using pulse shape discrimination methods. At step 408b it is determined if the waveform comprises a tailing end such as tail 326 shown in FIG. 3E, or any other distortion incompatible with the signal being due to the first detector. At step 410b if the output signal waveform comprises a tail or distortion the signal is rejected as indicating presence of pulse pileup. At step 412b if the output signal waveform does not exhibit a tail or distortion as shown in tail 326 in FIG. 3E, the signal is accepted as indicating no pulse pileup was detected. In another embodiment, if the output signal waveform comprises a tail or distortion the waveform is rejected as indicating presence of pulse pileup. At step 412b if the output signal waveform does not exhibit a tail or distortion as shown in tail 326 in FIG. 3E, the waveform is accepted as indicating no pulse pileup was detected. In combination with many other events due to incident radiation that are selected using step 412b, a pulse pileup-suppressed spectrum can be formed by histogramming the energies of the digitized signals. As is well-known in the art, the energy of the digitized signal may be obtained by summing all relevant samples of the digitized signal and multiplying the result with a calibration constant.

Optionally, in some embodiments, a second set of detectors is included and incident radiation that is not absorbed by the first detector, may be received by the second set of detectors, surrounding the first detector, wherein the first detector comprises a first scintillation material and the second set of detectors comprises either a second, different scintillation material, or the same scintillation material as the first detector either with an added signal delay or signal inversion as described earlier. Signals from the first detector and the second set of detectors are then fed to the input of a digitizer to produce a digitized output sampled signal with waveform.

For detecting Compton scatter, it is preferred to combine the signals for the first detector or set of detectors and the separately positioned second detector or set of detectors into a single signal before they are input into the digitizer, thereby producing a digitized waveform which is then analyzed using a pulse shape discrimination technique. By doing so, this obviates the need for acquiring separate digital signals, measuring coincidences in time, and then rejecting an acquisition. For detecting pulse pileup, a second set of detectors is not required but may be included.

Figure 5A:
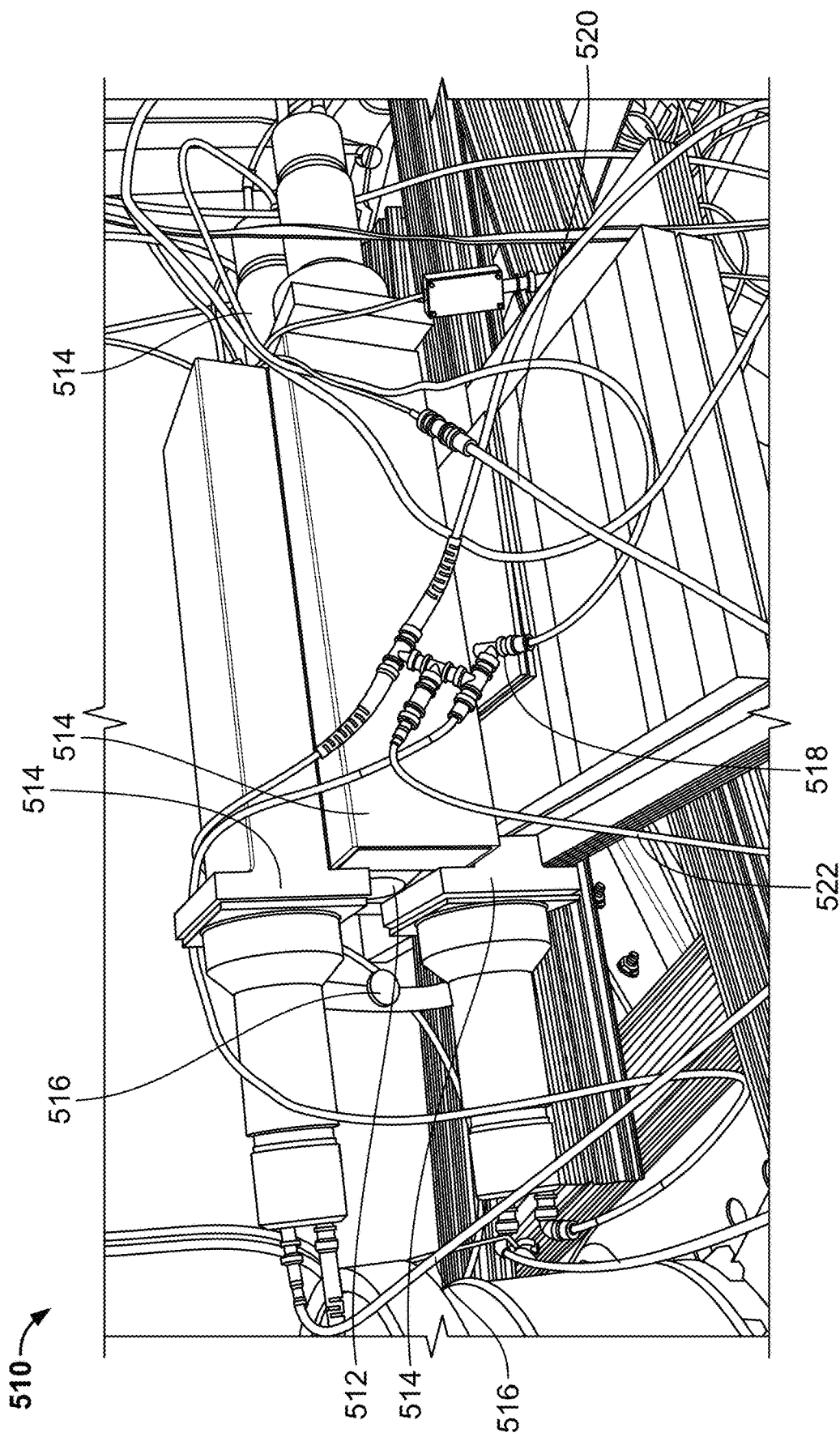
FIG. 5A illustrates an experimental setup of the Compton detection system of the present specification, in accordance with an embodiment of the present specification.
Figure 5B:
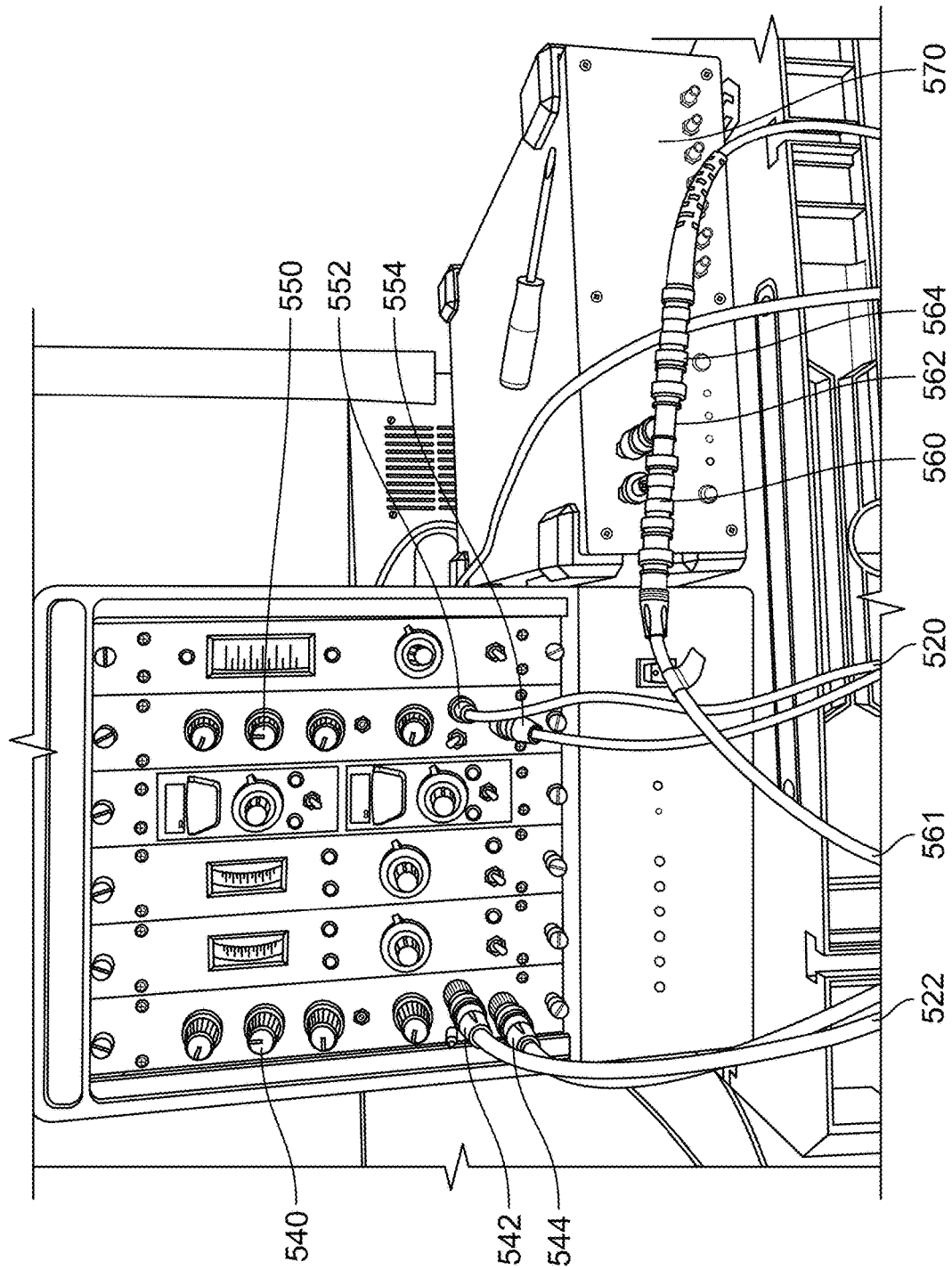
FIG. 5B further illustrates the experimental setup of the Compton detection system of the present specification in conjunction with FIG. 5A.

FIGS. 5A and 5B illustrate an experimental setup 510 of the Compton detection system shown in FIG. 2D, in accordance with an embodiment of the present specification. A first detector 512 is surrounded by a second set of detectors 514, being irradiated simultaneously by $^{137}$Cs and $^{60}$Co radioactive sources 516. Output signals of all second detectors 514 are connected by coaxial BNC cables to a tree of BNC T adapters 518. As shown in FIG. 5B, a cable 522 carrying the sum signal of second detectors 514 from BNC T adapters 518 is connected to an input 542 of an Ortec 474 timing filter amplifier 540. An output 544 of the timing filter amplifier 540 is connected to a BNC T adapter 562 through a 6-dB attenuator 560 and cable 561. Referring to FIGS. 5A and 5B, cable 520 carrying the output signal of first detector 512 is connected to an input 552 of an Ortec 474 timing filter amplifier 550 and a corresponding output 554 of timing filter amplifier 550 is connected to the BNC T adapter 562 through the cable 561 and the 6-dB attenuator 564. A center of the BNC T adapter 562 is connected to an input of a digitizer 570.

In the experimental setup shown in FIGS. 5A and 5B, the first detector 512 is a cylindrical Cesium Lithium Lanthanum Bromide Chloride (CLLBC) detector having a diameter of 2 inches and a length of 2 inches. The second set of detectors 514 comprise four Sodium Iodide (NaI) detectors, each having a dimension of 16 inches by 4 inches by 2 inches. As shown in FIG. 5B, experimental setup 510 comprises two timing filter amplifiers 540, 550, and can be used to demonstrate a number of embodiments of the Compton detection system of the present specification, including embodiments that do not require the use of amplifiers. In an embodiment, both timing filter amplifiers 540, 550 are set to a non-inverting mode, wherein the polarity of an output signal of the filters is the same as the polarity of the corresponding input signal. In another embodiment, the timing filter amplifier 550 is set to an inverting mode wherein the polarity of the corresponding output signal is reversed.

Figure 6:
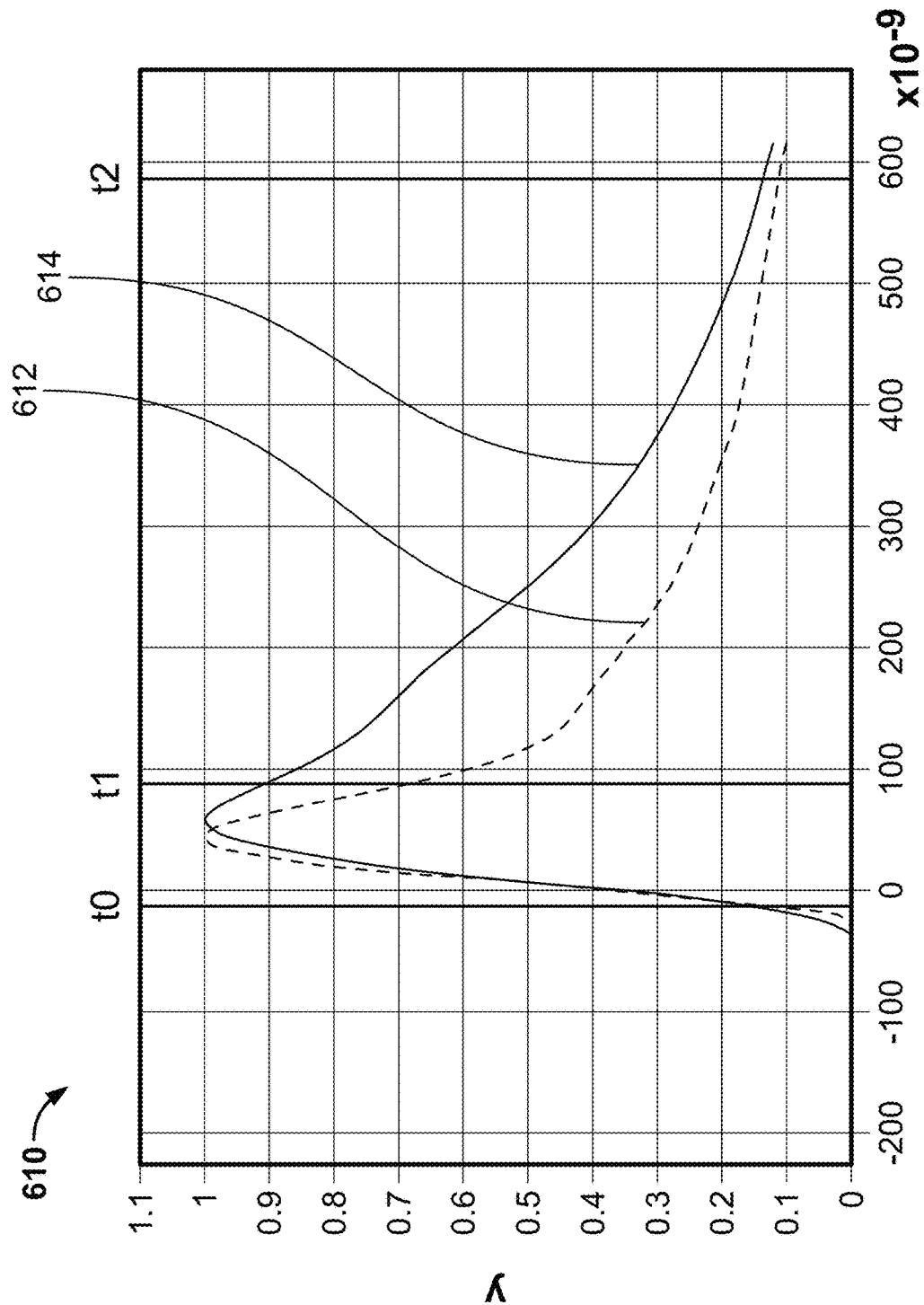
FIG. 6 depicts a plot of shape amplitudes vs. time (in seconds) of the signals obtained from the first detector and the second set of detectors shown in FIGS. 5A and 5B.

FIG. 6 shows a plot of shape amplitudes (on the y-axis) vs. time (in seconds) (on the x-axis) of the signals obtained from the first detector and the second set of detectors shown in FIGS. 5A, 5B. Referring to FIGS. 5A, 5B and 6, plot 610 comprises a signal shape 612 which is the average signal shape of signals obtained from CLLBC detector 512 and a signal shape 614 which is the average signal shape of signals obtained from NaI detectors 514. As is evident from plot 610, signals 612 from CLLBC detector 512 have a lower tail than signals 614 from NaI detectors 514. In an embodiment, a pulse shape discrimination technique is used to analyze the digitized signal to obtain an event waveform.

For example, for the waveform 612 and 614, starting at a time t0 and extending in length to a time t2, and comprising a peak part and a tail part, an intermediate time t1 is defined between time t0 and time t2, where t1 is chosen so as to be after the peak part of the signals 612, 614. Then the values of the samples of the waveform are added together to obtain a sum P comprising the values of all samples between time t0 and time t2, and a sum T comprising the values of all samples between time t1 and time t2. The ratio of the sum T to the sum P is known as the (gated) Pulse Shape Discrimination (PSD) value, which value will be larger if additional signal is present in the tail of the waveform, since then sum T would be relatively large compared to sum P. If no additional signal is present, then the PSD value will be a typical characteristic of the first detector, given the nature of the scintillation material and the choices of times t0, t1, and t2.

In various embodiments, any type of PSD technique known to persons of skill in the art, such as but not limited to wavelet-based PSD, and pulse-shape-fitting-based PSD, may be used to analyze the digitized detector output signals.

Figure 7A:
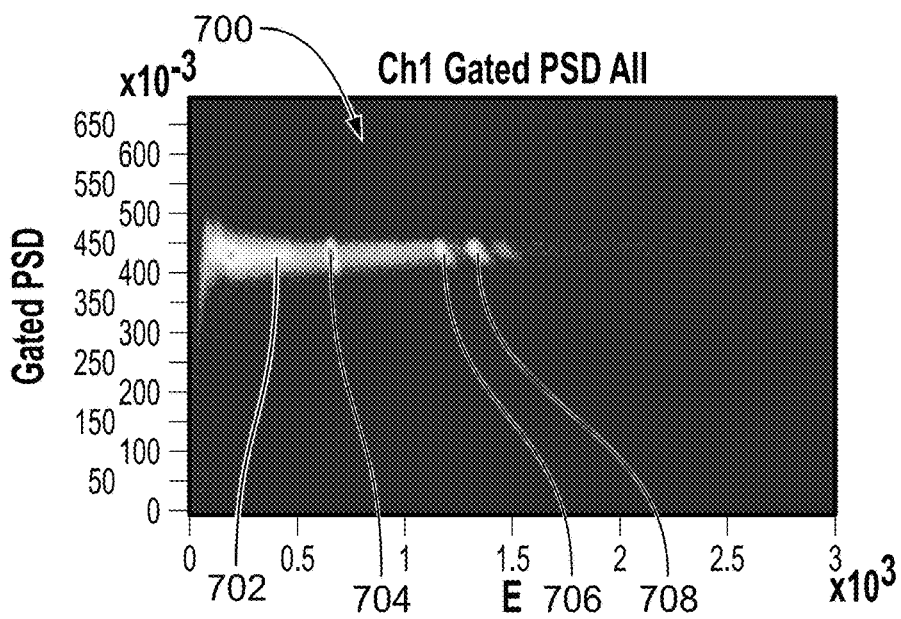
FIG. 7A depicts a two-dimensional plot of PSD values vs. gamma-ray energy (E) corresponding to the signal obtained only from the first detector of the experimental setup shown in FIGS. 5A and 5B.

FIG. 7A shows a two-dimensional plot 700 of gated PSD values vs. gamma-ray energy (E) corresponding to the signal obtained only from the first detector of the experimental setup shown in FIGS. 5A and 5B. Referring to FIGS. 5A, 5B and 7A, plot 700 represents the PSD values vs. gamma ray energy for signals from only the CLLBC detector 512, obtained by disconnecting the cable 522 that carries the sum of NaI detector signals from the input 542 of timing filter amplifier 540. The plot 700 comprises a plurality of points mapped to represent PSD and gamma-ray energy values corresponding to the signal obtained from the first detector 512. Black color portions represent an absence of mapped points, while blue, green, yellow and red colors on the plot represent increasing (in that order) number of mapped points, with blue color representing the least number of mapped points and the red color representing the maximum number of mapped points. As shown in plot 700, a ridge 702 of mapped points is present at PSD values lying between approximately $400\times10^{-3}$ and $500\times10^{-3}$. Ridge 702 comprises three sharp yellow-green and red spots 704, 706 and 708 at energies of approximately $0.66\times10^3$, $1.17\times10^3$ and $1.33\times10^3$ respectively, which are due to one characteristic gamma ray energy of the $^{137}$Cs source 516 shown in FIG. 5A, and two characteristic gamma ray energies from the $^{60}$Co source 516 as detected by the first detector 512.

Figure 7B:
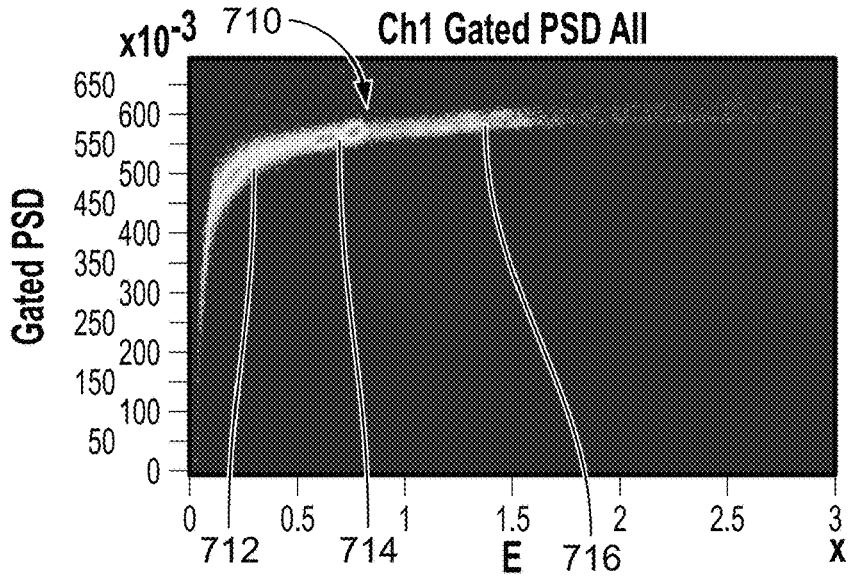
FIG. 7B depicts a two-dimensional plot of PSD values vs. gamma-ray energy (E) corresponding to the signal obtained only from the second set of detectors of the experimental setup shown in FIGS. 5A and 5B.

FIG. 7B shows a two-dimensional plot 710 of PSD values vs. gamma-ray energy (E) corresponding to the signal obtained only from the second set of detectors of the experimental setup shown in FIGS. 5A and 5B, wherein both the timing filter amplifiers 540 and 550 are set to operate in a non-inverting mode. Referring to FIGS. 5A, 5B and 7B, plot 710 represents PSD values vs. gamma-ray energy E for signals from only the NaI detectors 514, obtained by disconnecting the cable 520 carrying the signal from CLLBC detector 512 from the input 552 of timing filter amplifier 550. The plot 710 comprises a plurality of points mapped using different colors to represent PSD and gamma ray values corresponding to the signal obtained from the second detectors 514. Black color portions represent an absence of mapped points, while blue, green, yellow and red colors on the plot represent increasing (in that order) number of mapped points, with blue color representing the least number of mapped points and the red color representing the maximum number of mapped points. As shown in plot 710, a ridge 712 of mapped points is obtained at PSD values lying between approximately $450\times10^{-3}$ and $600\times10^{-3}$. Ridge 712 comprises a plurality of enhanced red spots 714 and green spots 716 at (uncalibrated) energies of approximately $0.9\times10^3$ and $1.5\times10^3$ respectively, which are due to a characteristic energy of the $^{137}$Cs source 516, and two characteristic gamma ray energies from the $^{60}$Co source 516 as detected by the second set of detectors 514. Referring to FIGS. 5A, 5B, 7A and 7B, it is apparent from plots 700 and 710 that the PSD values (shown in FIG. 7B) for NaI detectors 514 are higher than the PSD values (shown in FIG. 7A) for the CLLBC detector 512, thereby indicating that the signals obtained from NaI detectors 514 exhibit a higher tail than the signals obtained from the CLLBC detector 512.

Figure 7C:
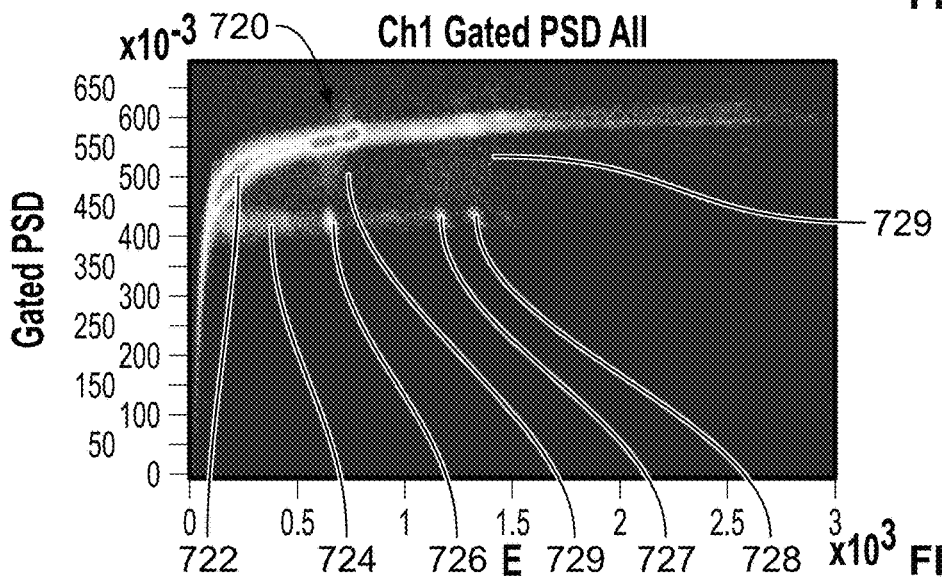
FIG. 7C depicts a two-dimensional plot of PSD values vs. gamma-ray energy (E) corresponding to the signal obtained from both the first detector and the second set of detectors of the experimental setup shown in FIGS. 5A and 5B.

FIG. 7C shows a two-dimensional plot 720 of PSD values vs. gamma-ray energy (E) corresponding to the signal obtained from both the first detector and the second set of detectors of the experimental setup shown in FIGS. 5A and 5B, wherein both the timing filter amplifiers 540 and 550 are set to operate in a non-inverting mode. Referring to FIGS. 5A, 5B and 7C, plot 720 shows a two-dimensional plot of PSD values vs. gamma-ray energy (E) for signals from CLLBC detector 512 and NaI detectors 514, when the cable 522 from NaI detectors 514 is connected to the input of timing filter amplifier 540 and the cable 520 from the CLLBC detector 512 is connected to the input of timing filter amplifier 550. The plot 720 comprises a plurality of points mapped using different colors to represent PSD and gamma ray energy values corresponding to the signals obtained from all the detectors 512 and 514. Black color portions represent an absence of mapped points, while blue, green, yellow and red colors on the plot represent increasing (in that order) number of mapped points, with blue color representing the least number of mapped points and the red color representing the maximum number of mapped points. As shown in plot 720, two ridges 722 and 724 of mapped points, represent PSD values lying between approximately $400 \times 10^{-3}$ and $450 \times 10^{-3}$ due to signals from only CLLBC detector 512, and PSD values lying between approximately $450 \times 10^{-3}$ and $600 \times 10^{-3}$ due only to NaI detectors 514, respectively. The lower PSD ridge 724 is represented primarily in blue color, indicating fewer mapped points in the plot than the mapped points represented in red forming ridge 722. Ridge 724 features three enhanced blue spots 726, 727 and 728 present at energies of approximately $0.66 \times 10^3$, $1.17 \times 10^3$ and $1.33 \times 10^3$ respectively, which are due to the characteristic energy of the $^{137}$Cs source 516 and two characteristic gamma ray energies from the $^{60}$Co source 516. Mapped points 729 represented in blue color lying between ridges 722 and 724, are obtained due to signal detection from both CLLBC detector 512 and NaI detectors 514, and are indicative of the detection of Compton scatter.

Figure 7D:
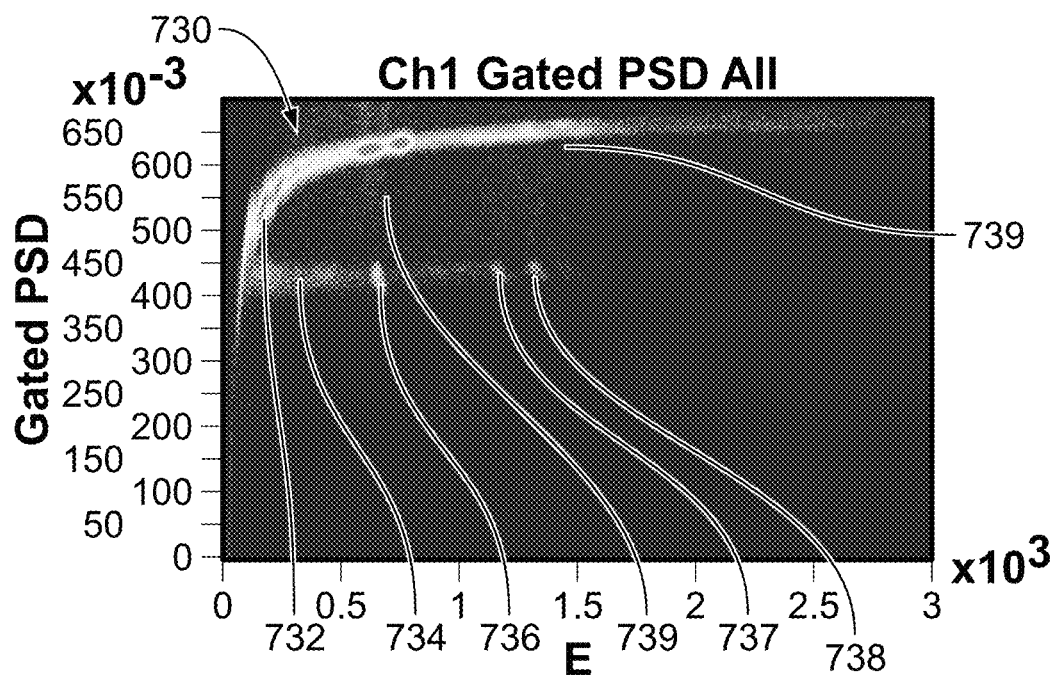
FIG. 7D depicts a two-dimensional plot of PSD values vs. gamma-ray energy (E) corresponding to the signal obtained from both the first detector and the second set of detectors of the experimental setup shown in FIGS. 5A and 5B with a long cable inserted in the signal chain of the second set of detectors.

FIG. 7D shows a two-dimensional plot 730 of PSD values vs. gamma-ray energy (E) corresponding to the signal obtained from both the first detector and the second set of detectors of the experimental setup shown in FIGS. 5A and 5B, wherein both the timing filter amplifiers 540 and 550 are set to operate in a non-inverting mode. Referring to FIGS. 5A, 5B a 50 feet long cable is inserted in the signal chain between the summed signals of second detectors 514 and the input 542 of timing filter amplifier 540. Referring to FIGS. 5A, 5B and 7D, plot 730 shows a two-dimensional plot of PSD values vs. gamma-ray energy (E) for signals from CLLBC detector 512 and NaI detectors 514, when the cable 522 carrying signals from the from NaI detectors 514 is coupled with the 50 feet cable and is connected to the input of timing filter amplifier 540 and the cable 520 from CLLBC detector 512 is connected to the input of timing filter amplifier 550. The plot 730 comprises a plurality of points mapped using different colors to represent PSD and gamma ray energy values corresponding to the signals obtained from all the detectors 512 and 514. Black color portions represent an absence of mapped points, while blue, green, yellow and red colors on the plot represent increasing (in that order) number of mapped points, with blue color representing the least number of mapped points and the red color representing the maximum number of mapped points. As shown in plot 730, two ridges 732 and 734 of mapped points, represent PSD values lying between approximately $400 \times 10^{-3}$ and $450 \times 10^{-3}$ due to signals from only CLLBC detector 512, and PSD values lying between approximately $500 \times 10^{-3}$ and $650 \times 10^{-3}$ due only to NaI detectors 514, respectively. The lower PSD ridge 734 is represented primarily in blue color, indicating fewer mapped points in the plot than the mapped points represented in red forming ridge 732. Ridge 734 features three enhanced blue spots 736, 737 and 738 present at energies of approximately $0.66 \times 10^3$, $1.17 \times 10^3$ and $1.33 \times 10^3$ respectively, which are due to the characteristic energy of the $^{137}$Cs source and two characteristic gamma ray energies from the $^{60}$Co source 516. Mapped points 739 represented in blue color lying between ridges 722 and 724, are obtained due to signal detection from both CLLBC detector 512 and NaI detectors 514, and are indicative of the detection of Compton scatter. In particular, the points mapped as ridge 732 due to signals from NaI detectors 514 have higher PSD values than the corresponding points mapped as ridge 722 in plot 720 shown in FIG. 7C. This is due to the addition of the 50 feet long cable to the cable connecting NaI detectors 514 to timing filter amplifier 540. As explained before, long cables have capacitance, inductance, and impedance that may enhance or reduce predefined ranges of signal frequency components, thereby changing the shape of the signal being carried by the cables. In the case demonstrated by plots 720 and 730 shown in FIGS. 7C and 7D, the addition of the 50 feet cable length resulted in lengthening of the shape of the plotted signal, and thereby increasing the height of the tail of the signal.

Figure 7E:
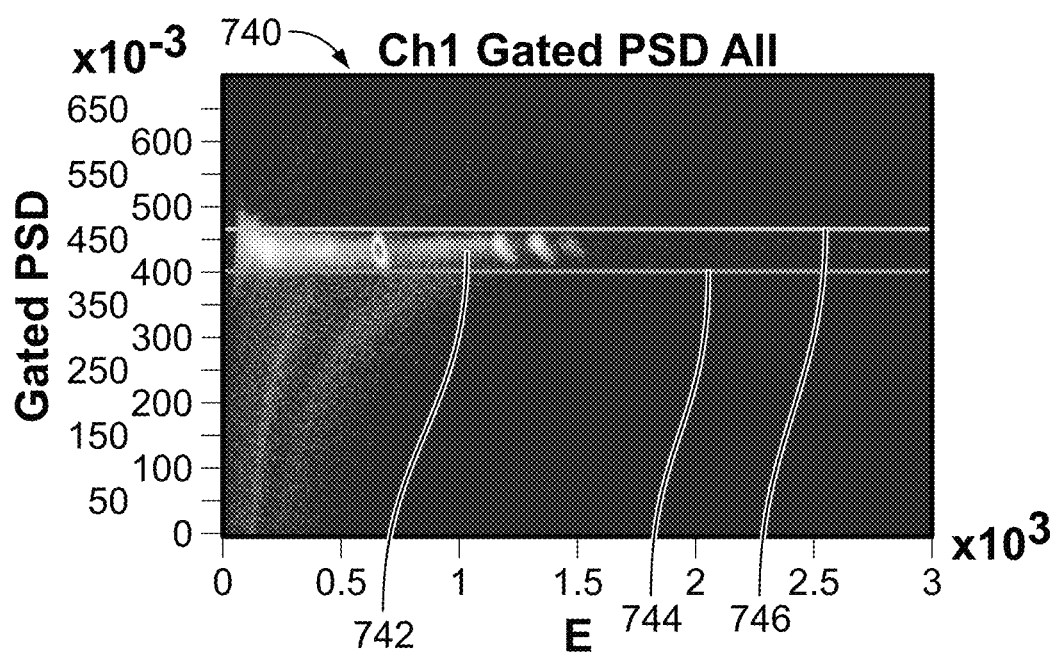
FIG. 7E shows a two-dimensional plot of PSD values vs. gamma-ray energy (E) corresponding to the signal obtained from both the first detector and the second set of detectors of the experimental setup shown in FIGS. 5A and 5B, wherein one of the timing filter amplifiers is set to operate in an inverting mode and the other timing filter amplifier is set to operate in a non-inverting mode.

FIG. 7E shows a two-dimensional plot 740 of PSD values vs. gamma-ray energy (E) corresponding to the signal obtained from both the first detector 512 and the second set of detectors 514 of the experimental setup shown in FIGS. 5A, 5B, wherein the timing filter amplifier 540 is set to operate in an inverting mode and the timing filter amplifier 550 is set to operate in a non-inverting mode. Referring to FIGS. 5A, 5B and 7E, plot 740 shows a two-dimensional plot of PSD values vs. gamma-ray energy (E) for signals from CLLBC detector 512 and NaI detectors 514, when the cable 522 from NaI detectors 514 is connected to the input of the inverting timing filter amplifier 540 and the cable 520 from CLLBC detector 512 is connected to the input of the non-inverting timing filter amplifier 550. As shown in plot 740, one clear ridge 742 of mapped points represents PSD values lying between approximately $400 \times 10^{-3}$ and $450 \times 10^{-3}$ due to signals from only CLLBC detector 512. PSD values lying below approximately $400 \times 10^{-3}$ are due to signals also detected by the NaI detectors 514, thereby indicating the presence of Compton scattering. Since the timing filter amplifier 540 inverts the signals of the NaI detectors 514, said signals are subtracted from, rather than added to, the signals detected in the CLLBC detector 512, particularly from the tail portion. Thus, the PSD values expected for Compton scattered events in this case are lower than the PSD values due to only CLLBC detector 512. Due to inversion of polarity, the signals detected only by the NaI detectors 514 do not trigger the digitizer, since the digitizer is set to trigger only upon receiving positive signals. Hence, mapped points representing signals detected by only the NaI detectors 514 do not appear in the plot 740. A contour 744 drawn in red color and a contour 746 drawn in green color on the plot 740 delimit at lower and higher bounds respectively. The mapped points between contours 744 and 746 result predominantly from the signals only detected by the CLLBC (first) detector 512, whereas the mapped points below contour 744 are indicative of signals detected by both the CLLBC (first) detector 512 and the (second) NaI detectors 514 as a result of Compton scatter out of detector 512 and into one of the NaI detectors 514.

Figure 7F:
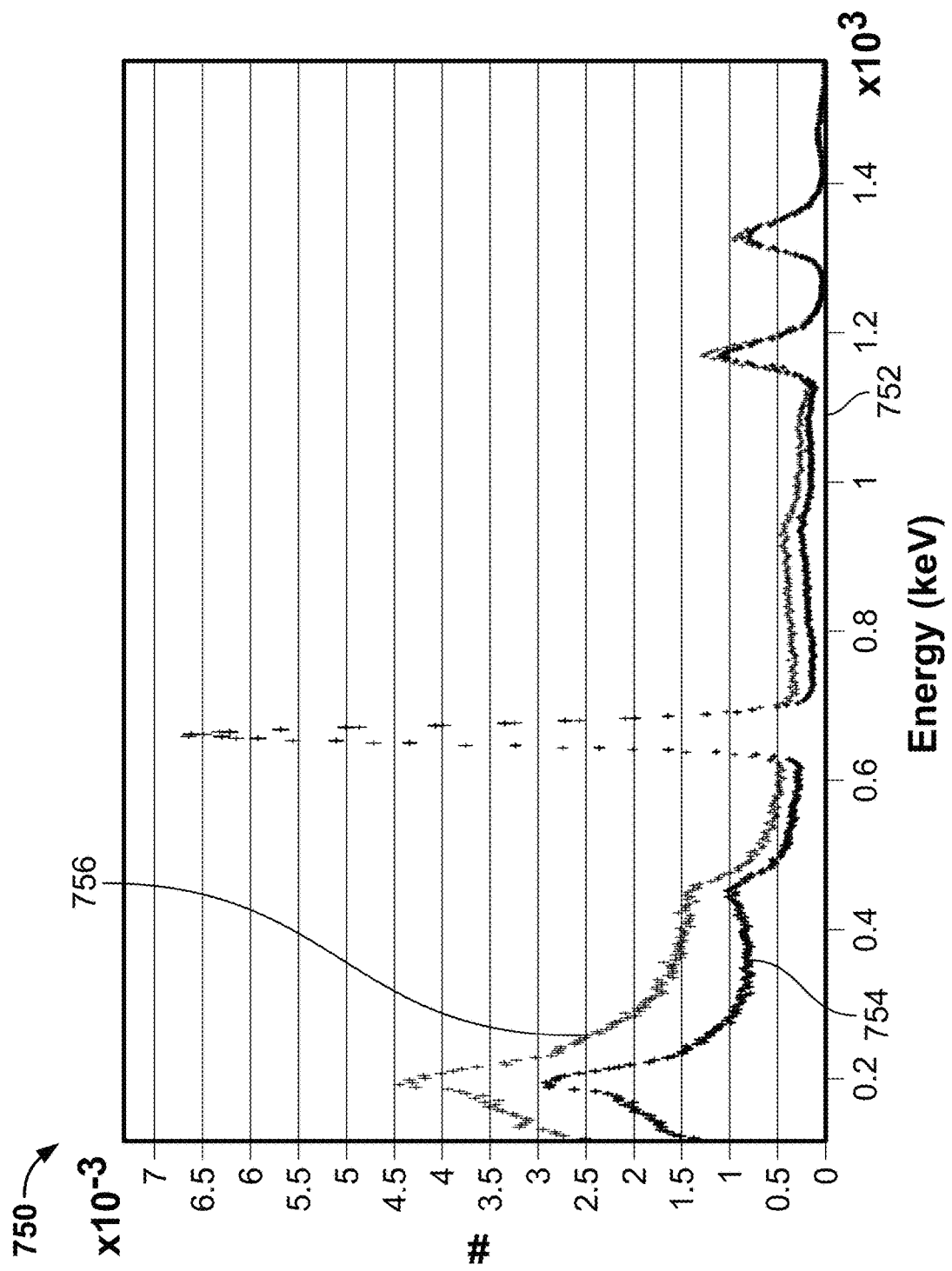
FIG. 7F is a graph illustrating projections of the mapped PSD points lying between the contours depicted in FIG. 7E, and projections of the mapped PSD points shown in FIG. 7A.

FIG. 7F is a graph 750 illustrating projections of the mapped PSD points lying between the contours depicted in FIG. 7E, and projections of the mapped PSD points shown in FIG. 7A. Graph 750 comprises a projection of the sum of all mapped points lying between contour 744 and contour 746 of plot 740 onto the energy axis 752, plotted as curve 754. A curve 756 represents a projection of all the mapped PSD points shown in FIG. 7A onto the energy axis 752. Curves 754 and 756 are, in this instance, not normalized, but mapped directly as projected. It can be observed from graph 750 that the curve 752 depicts a lower Compton contribution at low energies than the curve 754, by more than a factor of two, indicating that the experimental setup of FIGS. 5A, 5B representing the Compton detection system of the present specification, serves to reduce Compton contributions to spectra.

Figure 7G:
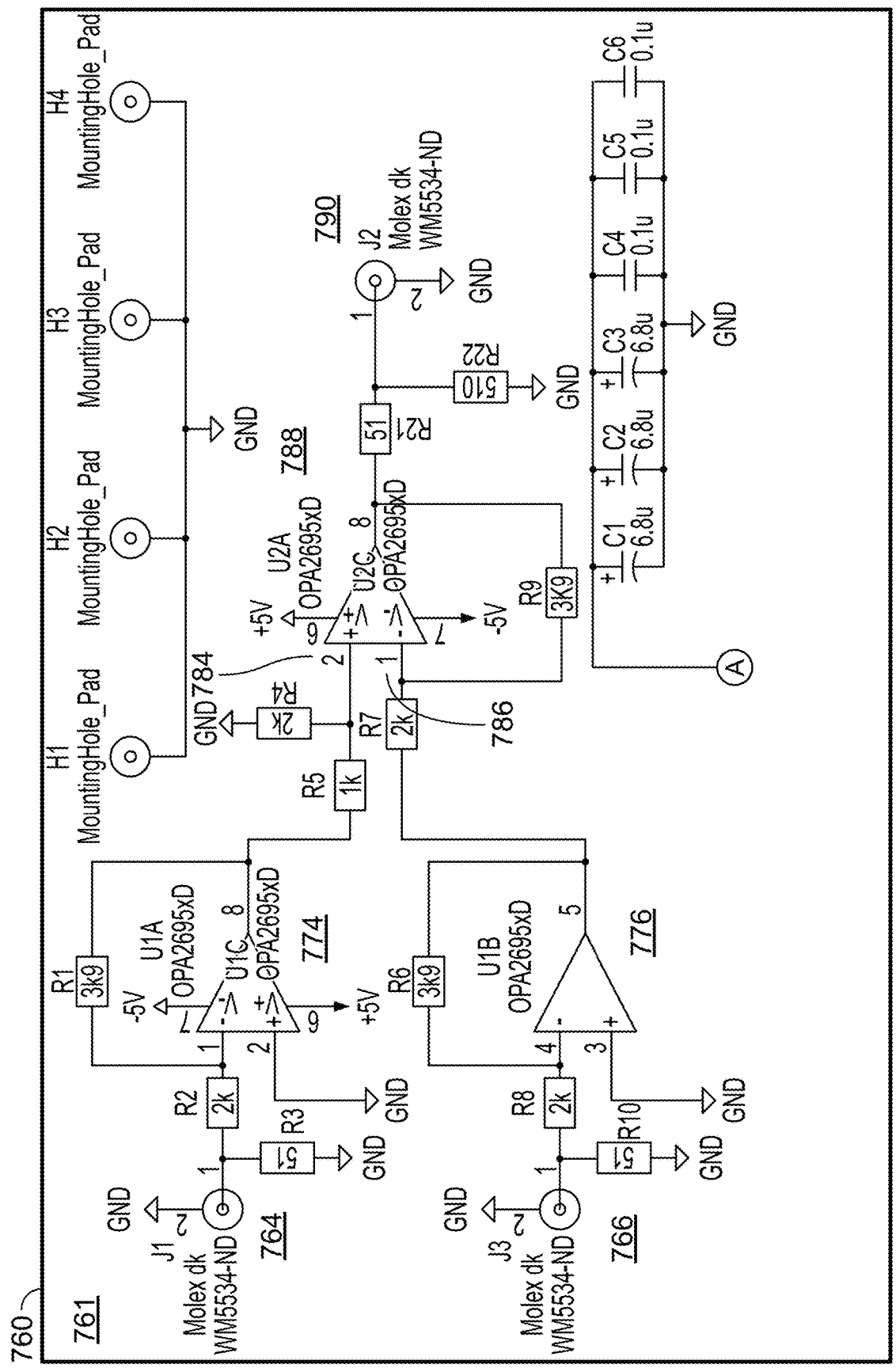
FIG. 7G shows a schematic for a dual, two-input, amplifier wherein, for each of the two amplifiers, a first input is buffered using a first operational amplifier circuit and a second input is buffered using a second operational amplifier circuit, and the output of said first circuit is connected to the non-inverting input of a third operational amplifier circuit and the output of said second circuit is connected to the inverting input of said third operational amplifier circuit.
Figure 7G:
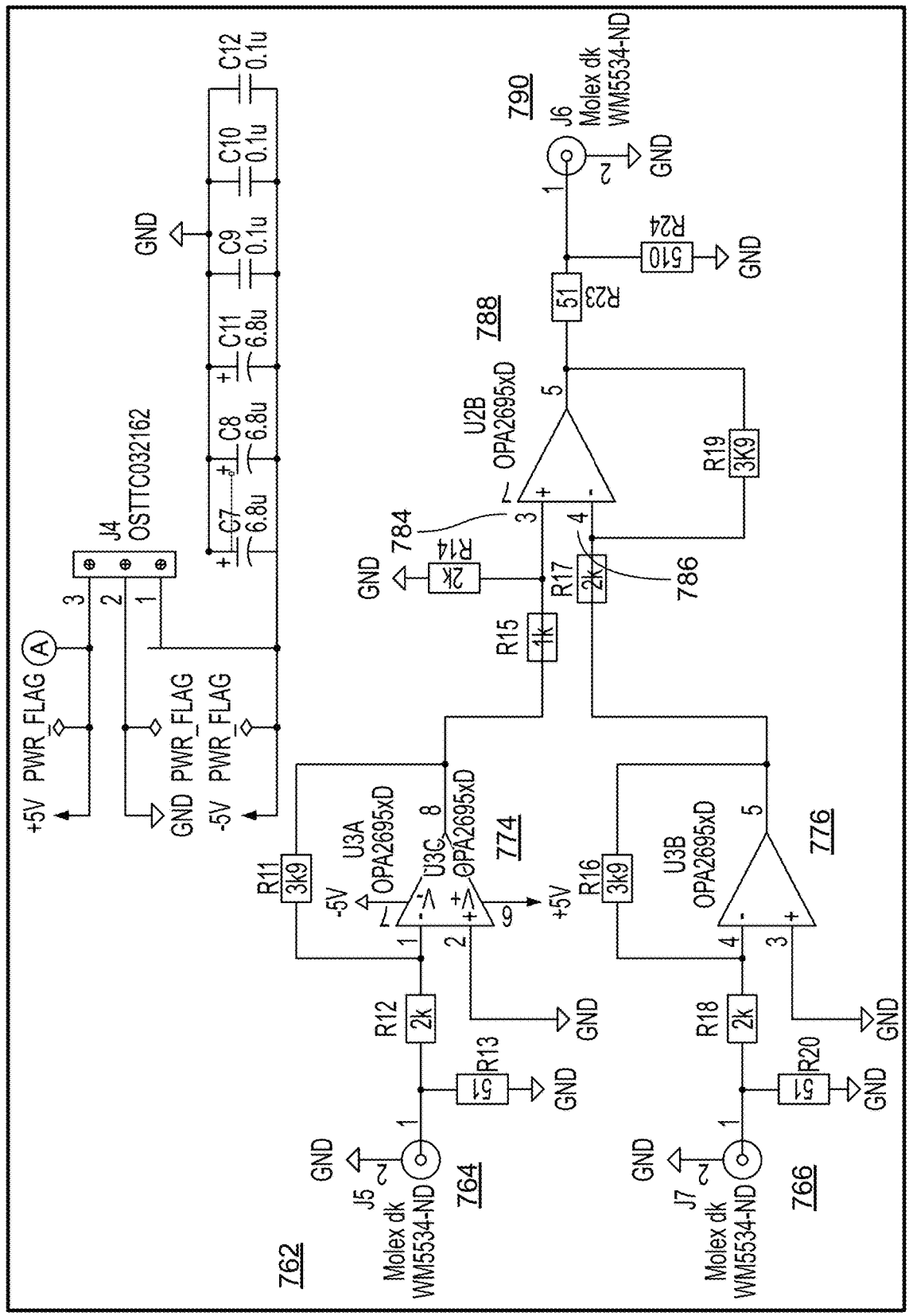

FIG. 7G is an electronic schematic 760 for a dual, two-input, amplifier circuit wherein, for each of the two amplifier channels 761 and 762, a first input 764 is buffered using a first operational amplifier circuit 774 and a second input 766 is buffered using a second operational amplifier circuit 776. Output of said first circuit 774 is connected to a non-inverting input 784 of a third operational amplifier circuit 788 and output of said second circuit 776 is connected to an inverting input 786 of said third operational amplifier circuit 788, with the combined signal delivered to the output 790. Each channel 761, 762, in amplifier circuit 760, comprises an alternative implementation of the timing filter amplifiers 540 and 550 described in connection with FIG. 5B, where one of the timing filter amplifiers is set to be inverting and the other set to be non-inverting. Schematic 760 is only an example of such a circuit, as is well-known to those skilled in the art.

Figure 8A:
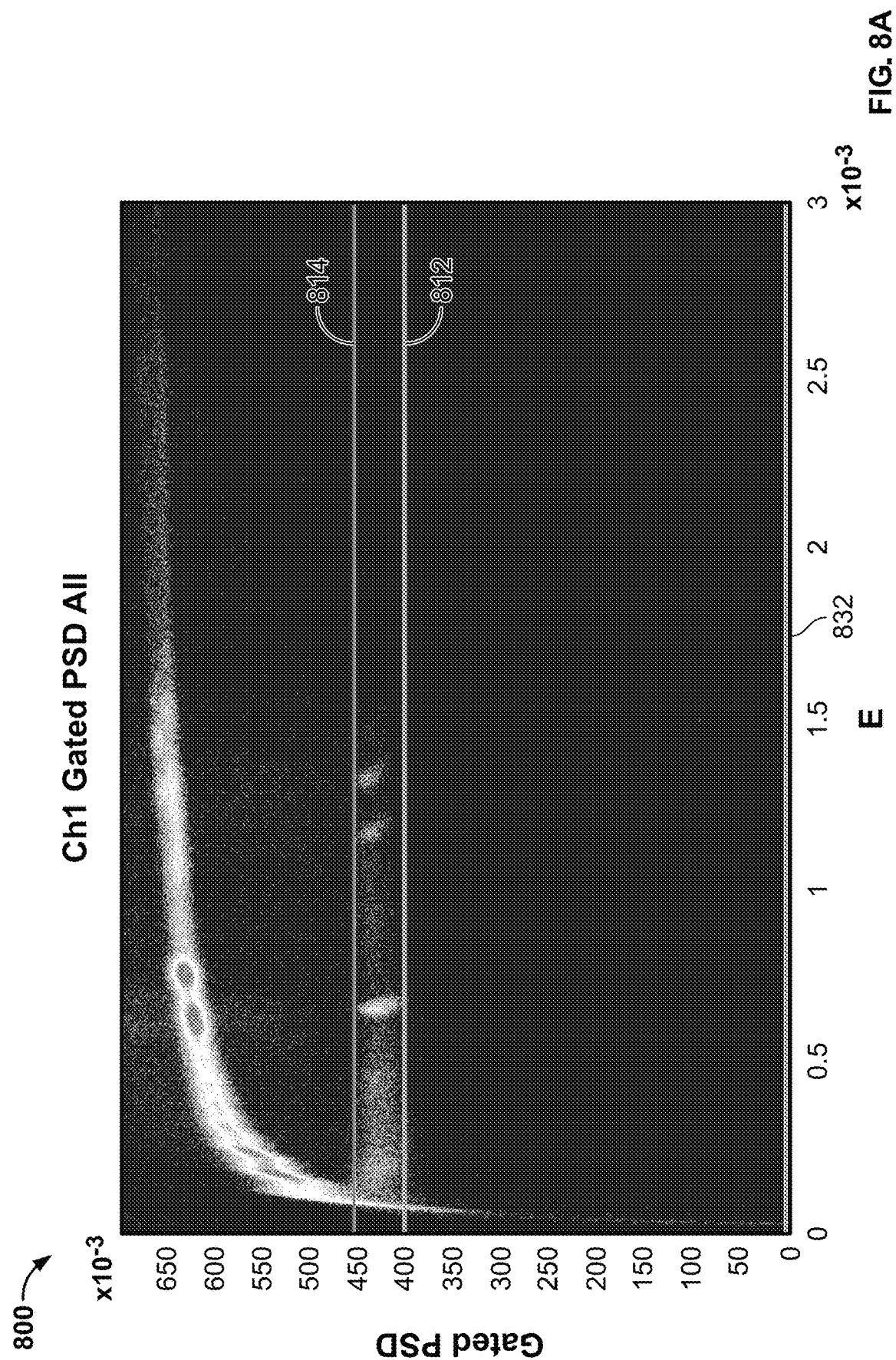
FIG. 8A depicts the plot shown in FIG. 7D along with emphasis lines delimiting the mapped points representing signals captured by only the first detector.

FIG. 8A shows a two-dimensional plot 800 of PSD values vs. gamma-ray energy (E) corresponding to the signal obtained from both the first detector 512 and the second set of detectors 514 of the experimental setup of FIGS. 5A, 5B as shown in FIG. 7C, along with emphasis lines delimiting the mapped points representing signals captured by only the first detector 512. Referring to FIGS. 5A, 5B and 8A, plot 800 depicts PSD values vs. gamma-ray energy (E) for signals from CLLBC detector 512 and NaI detectors 514, when the signals from both the NaI detectors 514 and the CLLBC detector 512 are connected to non-inverting timing filter amplifiers 540 and 550 respectively. A contour 812 drawn in red color and a contour 814 drawn in green color on the plot 800, delimits at lower and higher bounds respectively, the mapped points resulting only due to the signals detected by the CLLBC (first) detector 512.

Figure 8B:
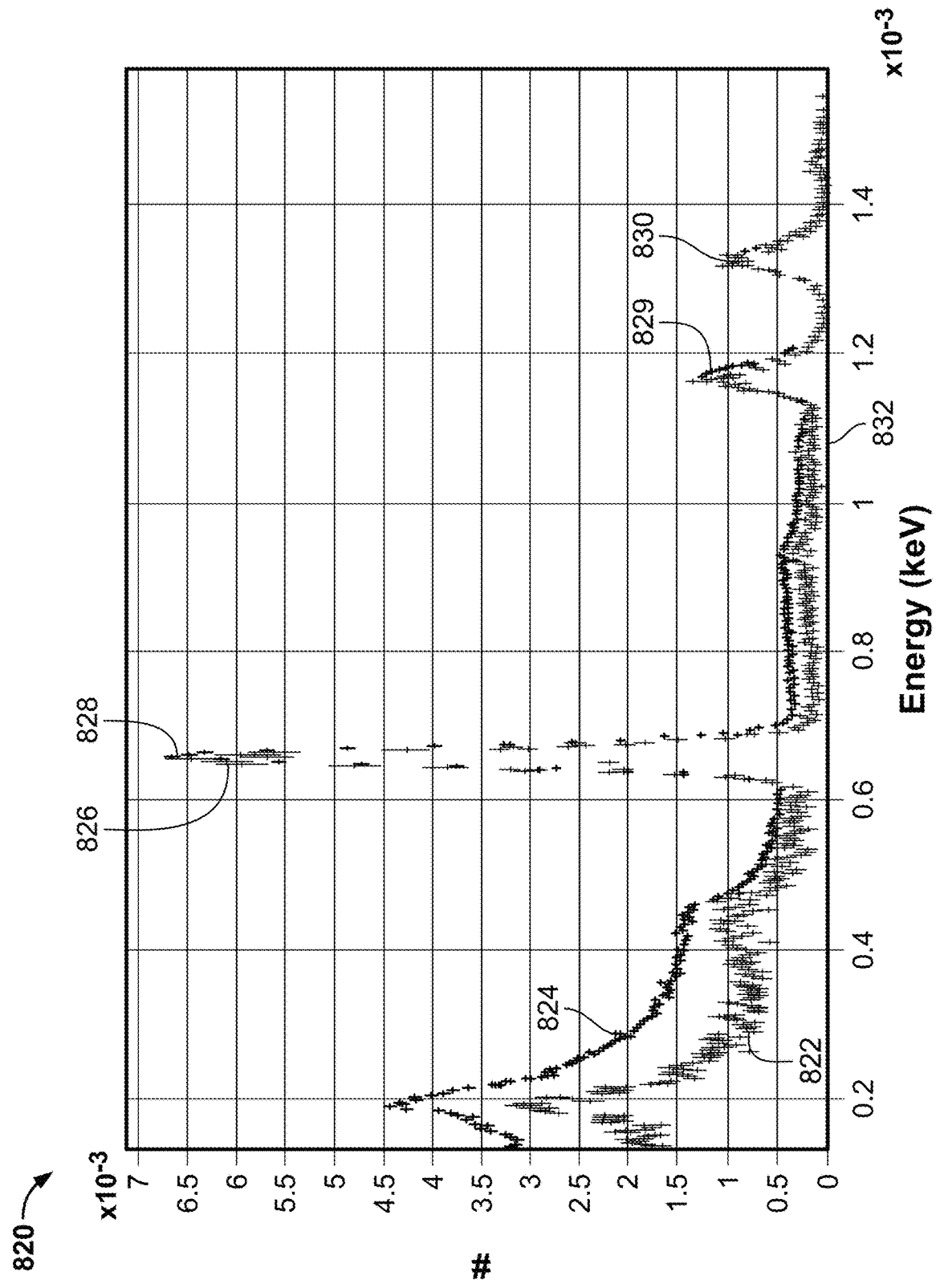
FIG. 8B is a graph illustrating projections of the mapped PSD points lying between the contours depicted in FIG. 8A and projections of the mapped PSD points shown in FIG. 7A.

FIG. 8B is a graph illustrating projections of the mapped PSD points lying between the contours depicted in FIG. 8A and projections of the mapped PSD points shown in FIG. 7A. Graph 820 comprises a projection of the sum of all mapped points lying between contour 812 and contour 814 onto the energy axis 832, plotted as curve 822. Curve 824 represents a projection of all the mapped PSD points shown in FIG. 7A onto the energy axis 830. Curves 822 and 824 are normalized so as that the peaks 826, 829 and 828, 830 of curves 822 and 824 respectively, are of approximately the same heights, as shown in the graph 820. It can be observed from graph 820 that the curve 822 depicts a lower Compton contribution at low energies than the curve 824, by more than a factor of two, indicating that the experimental setup of FIGS. 5A, 5B representing the Compton detection system of the present specification, serves to reduce Compton contributions to spectra.

Referring to the experimental setup of FIGS. 5A, 5B, as is known, when the number of incident gamma rays per second approaches the inverse of the decay time of the scintillator material of the detector 514, signals from subsequent gamma rays begin to partially overlap. This is known pulse/signal pileup. In case of occurrence of pulse/signal pileup, simple integration schemes cannot be used to determine signal energy, since energy from more than one signal may be counted as belonging to signal, leading to a distortion of the energy spectrum of gamma rays, which is undesirable. If a second signal partially overlaps a first signal, within the time windows used for pulse shape discrimination, then the shape of a tail portion of the first signal is changed, indicating thereby that pulse shape discrimination can be used to detect pulse/signal pileup leading to reduction in distortion of the gamma ray spectrum obtained. Referring to FIG. 6, if part of said second signal falls within the time period from t1 to t2, then the overall signal in the time period from t1 to t2 will be increased, leading to a higher PSD value. In contrast, if the second signal overlaps part of the first signal between times t0 and t1, then the signal in the time period from t0 to t1 will be increased, leading to a lower PSD value.

FIG. 9A shows a two-dimensional plot 910 of gated PSD values vs. gamma-ray energy (E) corresponding to the signal obtained from only one of the second set of detectors 514 of the experimental setup shown in FIGS. 5A, 5B, in a high-intensity field of gamma rays. FIG. 9A depicts plot 910 comprising a contour 916 drawn in red color and a contour 918 drawn in green color. Contours 916 and 918 delimit at lower and higher bounds respectively, the mapped points resulting due to the signals detected by said second (NaI) detector that do not form a part of any signal pileup. Blue shaded areas 914 outside these contours 916, 918 depict mapped signal points where a signal pileup contributes to the mapped signal.

Figure 9B:
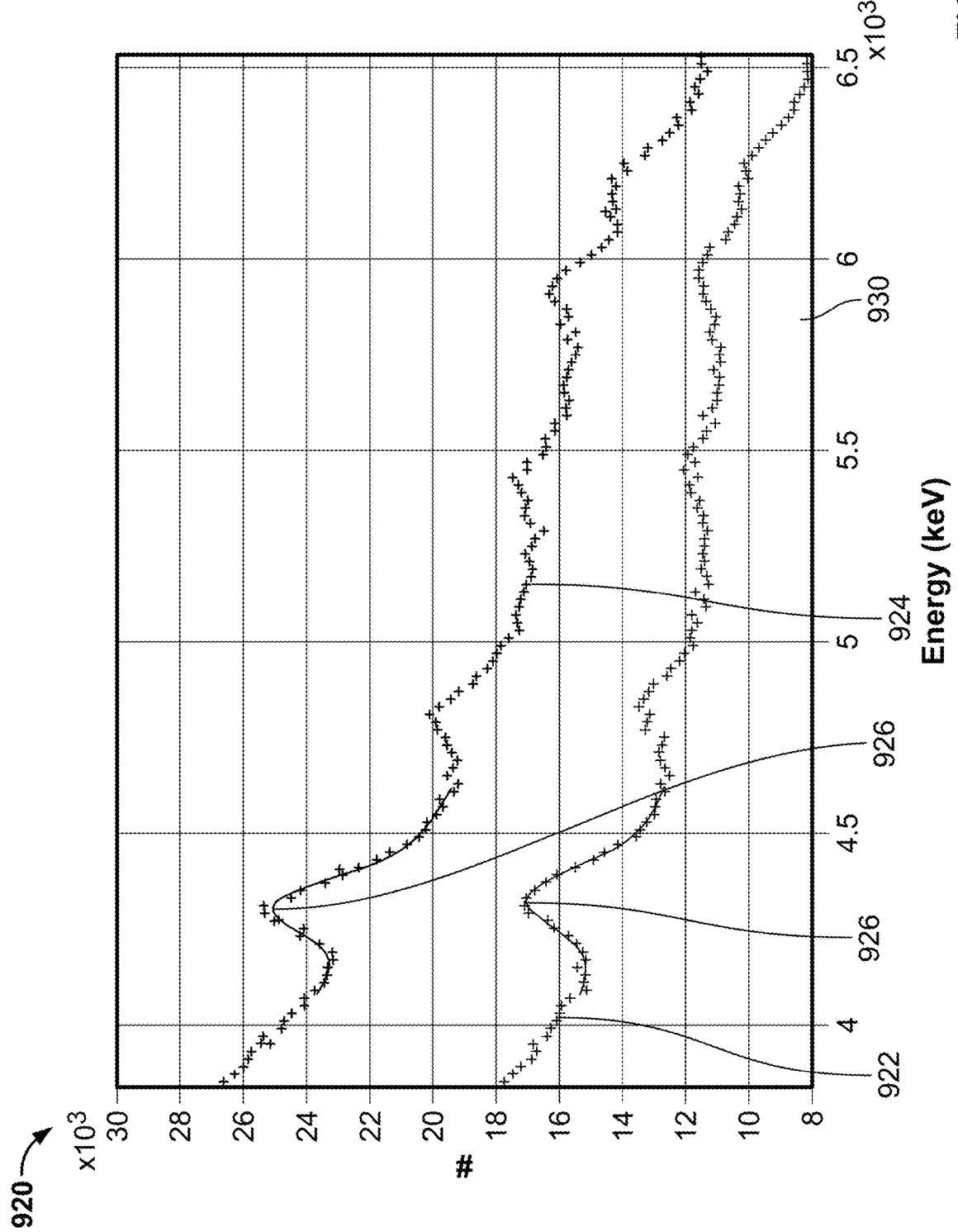
FIG. 9B is a graph illustrating projections of the mapped gated PSD points lying between the contours depicted in FIG. 9A and projections of all the mapped PSD points shown in FIG. 9A.

FIG. 9B is a graph 920 illustrating projections of the mapped PSD points lying between the contours depicted in FIG. 9A and projections of all the mapped gated PSD points shown in FIG. 9A. Graph 920 comprises a projection of the sum of all mapped points lying between contour 916 and contour 918 onto an energy axis 930, plotted as curve 922. Curve 924 represents a projection of all the mapped gated PSD points shown in FIG. 9A onto the energy axis 930. Curves 922 and 924 are not normalized, but depicted directly as projected. It can be observed from graph 920 that the curve 922 depicts a lower background contribution of signal pileup than the curve 924, by about a factor of two, while signal peaks such as peak 926 are minimally affected. This indicates that the methods of the present specification can also be used to reduce contributions of signal pileup to incident gamma ray spectra.

Hence, in various embodiments, the present specification provides a system and method for Compton scatter detection, wherein fewer channels of electronics are required to perform anti-Compton enhancement of incident radiation, as compared to prior art techniques. In various embodiments the method of the present specification provides reduction of the Compton background commonly found in smaller or less dense detectors. In addition, the methods used here can also be used to reduce the contribution of pileup events to spectra.

The above examples are merely illustrative of the many applications of the system of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

I claim:
1. A method for reducing Compton scatter contributions or pileup signal contributions to detected signals comprising:
    detecting incident radiation using a first detector system outputting a first analog detector signal;
    detecting incident radiation scattered by the first detector system using a second detector system positioned around the first detector system, wherein the second detector system outputs a second analog detector signal, and wherein a signal shape of the second analog detector signal differs from a signal shape of the first analog detector signal;

combining the first analog detector signal and the second analog detector signal, using a summing circuit or signal combination wiring, before digitizing either the first analog detector signal or the second analog detector signal to form a combined analog signal;

digitizing, using at least one digitizer, the combined analog signal to create a digitized output signal defined by a digitized output signal waveform;

using at least one processor, analyzing the digitized output signal waveform to determine a presence or an absence of a Compton scatter signal or a presence of an absence of a pileup signal, wherein a shape of the digitized output signal waveform is indicative of the presence or the absence of the Compton scatter signal or is indicative of the presence or the absence of the pileup signal; and accepting the digitized output signal if the Compton scatter signal and the pileup signal are absent or rejecting the digitized output signal if the Compton signal or the pileup signal is present.

2. The method of claim 1, wherein the second detector system is circumferentially positioned around the first detector system.

3. The method of claim 1, wherein the signal shape of the first analog detector signal and the signal shape of the second analog detector signal are each dependent on a signal decay time, a signal delay, or signal inversion.

4. The method of claim 3, wherein a signal decay time of the detectors of the second detector system is longer than a signal decay time of the detectors of the first detector system.

5. The method of claim 3, wherein a signal decay time of the detectors of the second detector system is shorter than a signal decay time of the detectors of the first detector system.

6. The method of claim 3, wherein a signal decay time of the detectors of the second detector system is same as a signal decay time of the detectors of the first detector system, and wherein a signal output from the second detector system is delayed relative to a signal output of the first detector system.

7. The method of claim 1, wherein the first detector system comprises one or more detectors.

8. The method of claim 1, wherein the second detector system comprises one or more detectors.

9. The method of claim 1, wherein analyzing the digitized output signal waveform comprises detecting a presence of a predefined waveform at a predefined time in the digitized output signal waveform, wherein the detected presence is indicative of at least one scattered signal detected by the second detector system.

10. The method of claim 9, wherein the presence of at least one scattered signal detected by the second detector system is indicative of a Compton scatter signal.

11. The method of claim 1, wherein the first detector system comprises a first scintillation material and the second detector system comprise a second scintillation material different from the first scintillation material.

12. The method of claim 11, wherein the first scintillation material is at least one of plastic scintillators, liquid scintillators, Cerium Bromide ($CeBr_3$), Lanthanum Bromide ($LaBr_3$), Lutetium Silicate (LSO), Lutetium Yttrium Ortho-Silicate (LYSO), or Lead Tungstate ($PbWO_4$).

13. The method of claim 11, wherein the second scintillation material is at least one of Sodium Iodide (NaI), Cesium Iodide (CsI), Strontium Iodide (SrI), Cadmium Tungstate ($CdWO_4$), Bismuth Germanate (BGO), or a liquid scintillator.

14. The method of claim 11, wherein the first scintillation material has a first signal decay time and the second scintillation material has a second signal decay time longer than the first decay time.

15. The method of claim 14, wherein the first signal decay time is smaller than 50 ns and the second signal decay time is longer than 100 ns.

16. The method of claim 11, wherein the first scintillation material has a first signal decay time, and the second scintillation material has a second signal decay time shorter than the first decay time.

17. The method of claim 11, wherein the first scintillation material has a first decay time, and the second scintillation material has a second decay time equal to the first decay time.

18. The method of claim 1, wherein the second analog detector signal is delayed with respect to the first analog detector signal by passing the second analog detector signal through a coaxial cable having a predefined length, before the second analog detector signal is input to the digitizer.

19. The method of claim 18, wherein the predefined length of the coaxial cable provides a delay in the second analog detector signal, wherein the delay is at least equal to a signal decay time of the first analog detector signal.

20. The method of claim 1, wherein analyzing the digitized output signal waveform comprises detecting a presence of a predefined waveform at a predefined time in the digitized output signal, wherein the detected presence is indicative of at least one distortion signal.

21. The method of claim 20, wherein the presence of the at least one distortion signal is indicative of the pileup signal contribution.

* * * * *